(12) United States Patent
Sugar et al.

(10) Patent No.: US 9,308,642 B2
(45) Date of Patent: Apr. 12, 2016

(54) SYSTEMS AND METHODS FOR ADDING OR SUBTRACTING ENERGY TO BODY MOTION

(71) Applicants: SpringActive, Inc., Tempe, AZ (US); Arizona Board of Regents on behalf of Arizona State University, Scottsdale, AZ (US)

(72) Inventors: Thomas G. Sugar, Tempe, AZ (US); Jason Kerestes, Summerville, SC (US); Matthew A. Holgate, Chandler, AZ (US); Jeffrey A. Ward, Phoenix, AZ (US); Thierry Flaven, Saint Pierre d'Allevard (FR)

(73) Assignees: Arizona Board of Regents on Behalf of Arizona State University, Scottsdale, AZ (US); SpringActive, Inc., Tempe, AZ (US)

(*) Notice: Subject to any disclaimer, the term of this patent is extended or adjusted under 35 U.S.C. 154(b) by 0 days.

(21) Appl. No.: 14/156,364

(22) Filed: Jan. 15, 2014

(65) Prior Publication Data

US 2014/0200715 A1   Jul. 17, 2014

Related U.S. Application Data

(60) Provisional application No. 61/753,199, filed on Jan. 16, 2013, provisional application No. 61/871,571, filed on Aug. 29, 2013.

(51) Int. Cl.
*B25J 9/00* (2006.01)

(52) U.S. Cl.
CPC .............. *B25J 9/0006* (2013.01); *Y10S 901/02* (2013.01)

(58) Field of Classification Search
CPC ............... A61H 1/00; A61H 1/001–1/003; A61H 1/005; A61H 1/02; A61H 2001/0211; A61H 1/0214; A61H 1/0229; A61H 1/0237–1/0244; A61H 1/0262; A61H 1/0266–1/0296; A61H 3/00; A61H 2003/005; A61H 2003/007; A61H 3/008; A61H 2201/1657–2201/1659; A61H 2201/50; A61H 2201/5058; A61H 2201/5064; A61H 2201/5069; A61H 2201/5079; A61H 2201/5084; Y10S 901/02–901/04; Y10S 901/09; Y10S 901/46; Y10S 901/48; Y10S 901/50; B25J 9/0006; B25J 11/002; B25J 13/088; A63B 21/00–21/00003; A63B 21/00058; A63B 21/00181; A63B 21/00196; A63B 21/1403–21/1449; A63B 23/035; A63B 23/04; A63B 23/12; A63B 2230/62–2230/625; G05B 19/423; G05B 2219/40305; G05B 2219/39004; G05B 2219/40202; A61F 2002/704; A61F 2/72; A61F 2002/7615; A61F 2002/7625; A61F 2/60; A61F 2002/607–2002/608
USPC ......... 700/250, 254, 256, 257, 258, 260–261, 700/264; 901/2–4, 9, 46, 48, 50; 318/568.13–568.14, 568.16, 568.22; 414/1–2

See application file for complete search history.

(56) References Cited

U.S. PATENT DOCUMENTS 7,366,587 B2 * 4/2008 Iribe et al. ..................... 700/245
(Continued)

FOREIGN PATENT DOCUMENTS

WO   2011096965 A2   8/2011
WO   2013086035 A1   6/2013

OTHER PUBLICATIONS

KAWAMOTO2004.pdf (Hiroaki Kawamoto, Yoshiyuki Sankai, Power Assist Method Based on Phase Sequence Driven by Interaction between Human and Robot Suit, 2004, IEEE, Proceedings of the 2004 IEEE International Workshop on Robot and Human Interactive Communication Kurashiki, Okayama Japan Sep. 20-22, 2004, pp. 491-496).*

(Continued)

*Primary Examiner* — Bao Long T Nguyen
(74) *Attorney, Agent, or Firm* — Robert D. Atkins; Patent Law Group: Atkins and Associates, P.C.

(57) ABSTRACT

A phase oscillating device for affecting movement of a limb or a primary body includes a sensor coupled to the primary body. A physical state of the primary body is measured using the sensor. A phase angle of the primary body is determined based on the physical state measurement. The physical state measurement includes position, velocity, or acceleration. The phase angle of the primary body is filtered using a sine function. An actuator is coupled to the primary body. The actuator is triggered based on the phase angle of the primary body to provide a force or torque to assist or resist movement of the primary body. A secondary body is coupled to the primary body. The secondary body is oscillated using the actuator, which is triggered in phase with a gait step. Alternatively, a fan is coupled to the primary body and actuator to provide the oscillating force.

31 Claims, 24 Drawing Sheets

(56) References Cited

U.S. PATENT DOCUMENTS

| | | | |
|---|---|---|---|
| 7,431,737 B2 | 10/2008 | Ragnarsdottir et al. | |
| 7,811,333 B2 | 10/2010 | Jonsson et al. | |
| 7,896,927 B2 | 3/2011 | Clausen et al. | |
| 8,057,550 B2 | 11/2011 | Clausen et al. | |
| 8,287,477 B1 | 10/2012 | Herr et al. | |
| 2002/0094919 A1* | 7/2002 | Rennex et al. | 482/124 |
| 2005/0070834 A1 | 3/2005 | Herr et al. | |
| 2007/0056592 A1* | 3/2007 | Angold et al. | 128/845 |
| 2007/0129653 A1 | 6/2007 | Sugar et al. | |
| 2010/0049102 A1* | 2/2010 | Yasuhara | 601/5 |
| 2010/0161077 A1 | 6/2010 | Boone et al. | |
| 2011/0082566 A1* | 4/2011 | Herr et al. | 623/24 |
| 2011/0264264 A1* | 10/2011 | Shirokura et al. | 700/245 |
| 2011/0312473 A1* | 12/2011 | Chu et al. | 482/54 |
| 2012/0259431 A1* | 10/2012 | Han et al. | 623/24 |

OTHER PUBLICATIONS

Bernardi, M. et al., (1995), "The Efficiency of Walking of Paraplegic Patients Using a Reciprocating Gait Orthosis," Spinal Cord 33(7): 409-415.

Boehler, Alexander W. et al., (2008), "Design, Implementation and Test Results of a Robust Control Algorithm for a Powered Ankle Foot Orthosis," IEEE International Conference on Robotics and Automation (ICRA), IEEE.

Hitt, Joseph et al., (2010), "Dismounted Soldier Biomechanical Power Regeneration Kit (SPaRK)," Proceedings of the 27th Army Science Conference, Orlando, FL.

Hitt, Joseph et al., (2010), "Bionic Running for Unilateral Transtibial Military Amputees," Proceedings of the 27th Army Science Conference, Orlando, FL.

Hollander, Kevin W. et al., (2005), "A Robotic "Jack Spring" for Ankle Gait Assistance," DETC2005-84492, ASME International Design Engineering Technical Conference (IDETC2005), Long Beach, CA, American Society of Mechanical Engineers.

Hollander, Kevin W. et al., (2006), "An Efficient Robotic Tendon for Gait Assistance," Journal of biomechanical engineering 128: 788.

Kawamoto, Hiroaki et al., (2003), "Power Assist Method for HAL-3 Estimating Operator's Intention Based on Motion Information," IEEE International Workshop on Robot and Human Interactive Communication, Millbrae, CA.

Kazerooni, H. et al., (2005), "On the Control of the Berkeley Lower Extremity Exoskeleton (BLEEX)," Proceedings of the 2005 IEEE International Conference on Robotics and Automation, Barcelona, Spain, Apr. 2005.

Norris, James A. et al., (2007), "Effect of Augmented Plantarflexion Power on Preferred Walking Speed and Economy in Young and Older Adults," Gait & Posture 25(4): 620-627.

Sawicki, Gregory S. et al., (2009), "Mechanics and Energetics of Incline Walking with Robotic Ankle Exoskeletons," Journal of Experimental Biology 212(1).

Sawicki, Gregory S. et al., (2009), "Powered Ankle Exoskeletons Reveal the Metabolic Cost of Plantar Flexor Mechanical Work During Walking with Longer Steps at Constant Step Frequency," Journal of Experimental Biology 212(1).

Sawicki, Gregory S. et al., (2009), "It Pays to Have a Spring in your Step," Exercise and Sport Sciences Reviews 37(3).

Sugar, Thomas G., (2002), "A Novel Selective Compliant Actuator," Mechatronics 12(9-10): 1157-1171.

Walsh, Conor James et al., "Development of a Lightweight, Under-Actuated Exoskeleton for Load-Carrying Augmentation," Proceedings of the 2006 IEEE International Conference on Robotics and Automation, Orlando, Florida, May 2006.

Walsh, Conor James et al., (2006), Biomimetic Design of an Under-Actuated Leg Exoskeleton for Load-Carrying Augmentation, Cambridge, MA, Massachusetts Inst of Tech, M.S.

Ward, Jeffrey et al., (2007), "Robotic Gait Trainer Reliability and Stroke Patient Case Study," IEEE 10th International Conference on Rehabilitation Robotics (ICORR), Holland.

Ward, Jeffrey et al., (2008), "Control Architectures for a Powered Ankle Foot Orthsosis," International Journal of Assistive Robotics and Mechatronics 9(2): 2-13.

Ward, Jeffrey et al., (2010), "Stroke Survivor Gait Adaptation and Performance After Training on a Powered Ankle Foot Orthosis," Proceedings of the IEEE International Conference on Robotics and Automation (ICRA), Anchorage, AK, IEEE.

Ward Jeffrey et al., (2011), "Using the Translational Potential Energy of Springs for Prosthetic Systems," IEEE Multi-conference on Systems and Control, Denver, CO, IEEE.

Hitt, J. et al., "An Active Foot-Ankle Prosthesis with Biomechanical Energy Regeneration", Journal of Medical Devices,vol. 4, 2010.

Belforte, G. et. al., "Pneumatic Active Gait Orthosis". Mechatronics 11, 2001, pp. 301-323.

Colombo, Gery et. al., "Treadmill Training of Paraplegic Patients Using a Robotic Orthosis", Journal of Rehabilitation Research and Development. vol. 37 No. 6., 2000, pp. 693-700.

Holgate, M. et al., "A Control Algorithm for a Prosthetic Ankle Using Phase Plane Invariants", Poster presentation at Dynamic Walking, Vancouver, Canada, 2009.

Guiraud, D., "Application of an Artificial Neural Network to the Control of an Active External Orthosis of the Lower Limb", Medical & Biological Engineering & Computing, Nov. 1994, vol. 32, pp. 610-614.

Herr, Hugh et al., "Patient-Adaptive Prosthetic and Orthotic Leg Systems", Proceedings of the International Federation for Medical & Biological Engineering, Reykjavik, Iceland, Jun. 18-22, 2002, pp. 18-21.

Hitt, J. et al., "A Robotic Transtibial Prosthesis with Regenerative Kinetics: The Design Analyses, Methods, and Testing", U.S. Army Military Amputee Research Program, 2008.

Holgate, M. et al., "Control Algorithms for Ankle Robots: A Reflection on the State-of-the-Art and Presentation of Two Novel Algorithms", 2nd IEEE RAS & EMBS International Conference on Biomedical Robotics and Biomechatronics, pp. 97-103, 2008.

Holgate, M., "Control of a Robotic Transtibial Prosthesis", A Dissertation, Arizona State University, Dec. 2009.

Holgate, M. et al., "A Novel Control Algorithm for Wearable Robotics Using Phase Plane Invariants", International Conference on Robotics and Automation, 2009.

Hitt, J. et al., "Robotic Transtibial Prosthesis with Biomechanical Energy Regeneration", Industrial Robot: An International Journal, vol. 36, Issue 5, pp. 441-447, 2009.

Bellman, R. et al., "SPARKy 3: Design of an Active Robotic Ankle Prosthesis with two Actuated Degrees of Freedom Using Regenerative Kinetics", 2nd IEEE RAS & EMBS International Conference on Biomedical Robotics and Biomechatronics, pp. 511-516, 2008.

Holgate, M., "The SPARKy (Spring Ankle with Regenerative Kinetics) Project: Choosing a DC Motor Based Actuation Method" 2nd IEEE RAS & EMBS International Conference on Biomedical Robotics and Biomechatronics, pp. 163-168, 2008.

Hitt, J. et al., "The SPARKy (Spring Ankle with Regenerative Kinetics) Project: Design and Analysis of a Robotic Transtibial Prosthesis with Regenerative Kinetics", ASME International Design Engineering Technical Conferences & Computers and Information in Engineering Conference (IDETC/CIE), CD-ROM, pp. 1-10, 2007.

* cited by examiner

SYSTEMS AND METHODS FOR ADDING OR SUBTRACTING ENERGY TO BODY MOTION

CLAIM TO DOMESTIC PRIORITY

The present application claims the benefit of U.S. Provisional Application No. 61/753,199, filed Jan. 16, 2013, and U.S. Provisional Application No. 61/871,571, filed Aug. 29, 2013, which applications are incorporated herein by reference.

FEDERALLY-SPONSORED RESEARCH OR DEVELOPMENT

The present invention was made with government support under grant number W911QX-12-1-0002, awarded by the Army Research Labs. The government has certain rights in the invention.

FIELD OF THE INVENTION

The present invention relates in general to prosthetic, orthotic, robotic, and exoskeleton devices and, more particularly, to oscillating mechanisms for adding or subtracting energy to motion of a body.

BACKGROUND OF THE INVENTION

Human locomotion, such as walking and running, is commonly described in terms of gait. Gait is a cyclical pattern of leg and foot movement that creates locomotion. A gait cycle is defined for a single leg and begins with the initial contact of the foot with the ground or heel strike. The conclusion of a gait cycle occurs when the same foot makes a second heel strike. The gait cycle can be divided into two phases, stance phase and swing phase. Stance phase begins with heel strike and ends when the toe of the same foot leaves the ground. Swing phase begins when the foot leaves contact with the ground and ends with heel strike of the same foot.

Prosthetic and orthotic devices help restore mobility to people who lack able-bodied motion or gait. Prosthetic devices are intended to replace the function or appearance of a missing limb and can return mobility to the wearer or user. Orthotic devices are intended to support or supplement an existing limb, by assisting with movement, reducing weight-bearing loads on the body, reducing pain, and controlling or restricting movement. Prosthetic and orthotic devices are available to replace or support various portions of the body. One goal of lower limb prosthetic and orthotic devices is to help the user achieve a normal gait while reducing energy expended by the user.

Individuals have unique gait patterns. Energy or metabolic expenditure during an individual's gait depends on several factors including, body mass, stride length, step rate, and other physical and environmental factors. Individuals have physical and metabolic limits, which determine the speed and distance an individual can travel on foot. Other forces hindering human gait are air drag and rolling friction. Decreasing the metabolic cost for an individual's gait allows the individual to run faster or travel for a longer distance while minimizing the energy expended by the individual.

Over-speed running and training is a method of reducing metabolic cost for gait. Using pulley systems and springs, two runners are coupled together to reduced metabolic cost when one runner pulls another. When an external, horizontal force is added to a runner on a treadmill, the force reduces the positive horizontal ground reaction force needed for push-off. The force increases the negative horizontal ground reaction force at landing which increases braking forces. However, attaching a pulley system to an individual to assist with gait leaves the individual tethered to the treadmill or to another runner. Negative damping has also been used to create an external force in the same direction as a velocity of the body by adding positive power. However, negative damping can cause an unstable amount of energy added as velocity increases.

SUMMARY OF THE INVENTION

A need exists for a wearable device that enhances motion and reduces metabolic output during activities. Accordingly, in one embodiment, the present invention is a method of making a movement assistance device comprising the steps of providing a sensor, measuring a physical state of a limb using the sensor, determining a phase angle of the limb based on the physical state, coupling an actuator to the limb, and triggering the actuator based on the phase angle of the limb to provide a force to assist movement of the limb.

In another embodiment, the present invention is a method of making a phase oscillating device comprising the steps of providing a sensor, measuring a physical state of a primary body using the sensor, determining a phase angle of the primary body based on the physical state, and triggering an actuator based on the phase angle of the primary body to oscillate a force or torque applied to the primary body.

In another embodiment, the present invention is a movement assistance device comprising a primary body and a sensor coupled to the primary body to measure a physical state of the primary body. A controller is coupled to the sensor to determine a phase angle based on a physical state of the primary body. A secondary body is coupled to the primary body. An actuator is coupled to the controller and secondary body to move the secondary body based on the phase angle of the primary body.

In another embodiment, the present invention is a phase oscillating device comprising a primary body and a sensor coupled to the primary body. A controller is coupled to the sensor to determine a phase angle of the primary body. An actuator is coupled to the controller to oscillate a signal to the actuator based on the phase angle of the primary body.

DETAILED DESCRIPTION OF THE DRAWINGS

The present invention is described in one or more embodiments in the following description with reference to the figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

Muscles, ligaments, and tendons of the human body facilitate motion of limbs and locomotion of the body. The human body can be described as a mass-spring-damper system with the mass of the torso mounted on spring-damper-based legs. Adding energy into the human mass-spring-damper system at correct timing enhances oscillations of the human system during motion or gait. A small addition of energy results in a large resonance response. For example, a small oscillating mass coupled to the human body adds positive power to the hopping motion during the toe off phase of the gait cycle. The additional power during the toe off phase of gait enhances the hop height response of the human body. An oscillating mass that moves based on the phase angle of the human body adds positive power to the hopping motion during the toe off phase of the gait cycle. Alternatively, the oscillating mass is controlled to oscillate out of phase with the gait cycle in order to decrease or subtract power from motion of the body. When the oscillating mass is moved in an anti-phase motion, the hop height is decreased and a resistance training device or motion absorber is created. Therefore, the wearable powered phase oscillating systems described herein incorporate an oscillating mass or periodic external force or torque to increase or decrease the power available during motion of a body or limb.

Figure 1A:
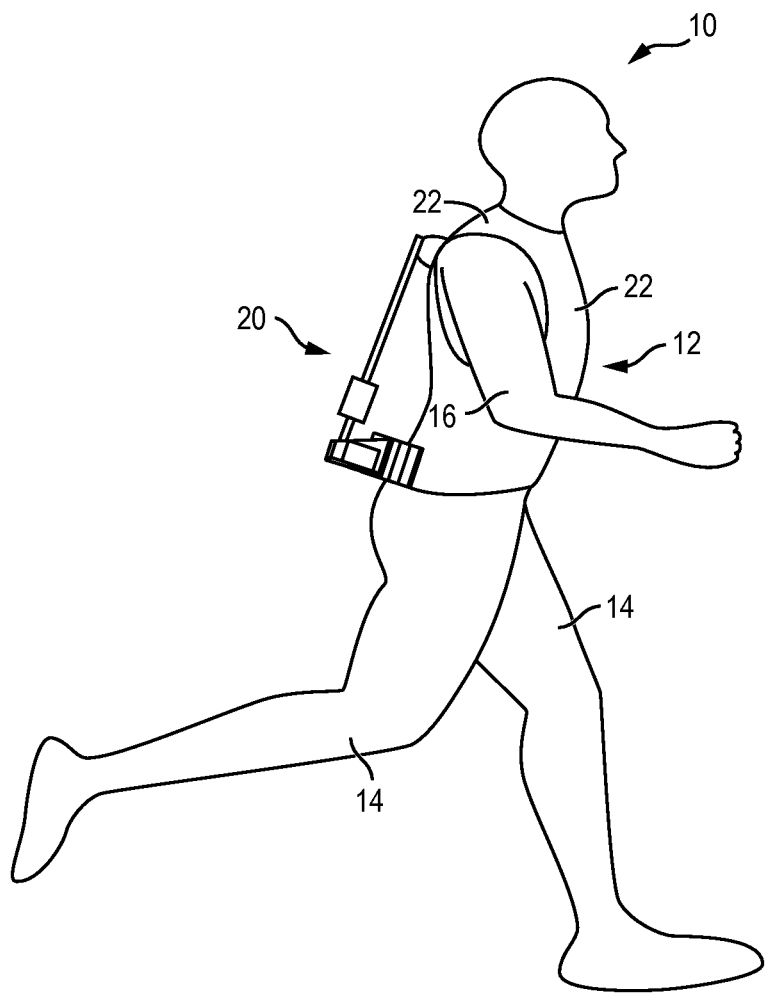
FIGs. 1a-1f illustrate a wearable phase oscillating system.

FIGS. 1a-1f show a wearable powered phase oscillating system. FIG. 1a shows a wearable powered phase oscillating system worn on a torso of a user. User 10 has torso 12, lower limbs 14, and upper limbs 16. User 10 wears a phase oscillating system 20 in order to increase or decrease the available power during movement of user 10, for example, during gait or other activities. Phase oscillating system 20 senses motion of the human body and responds by adding a negative or a positive external force.

Phase oscillating system 20 is a device that oscillates a secondary mass, which applies an external force to a primary body. The external forces created by phase oscillating system 20 act on user 10, the primary body. User 10 is the primary body in phase oscillating system 20. The force applied to user 10 by phase oscillating system 20 increases or decreases the power of the user's motion. User 10 wears phase oscillating system 20, or phase oscillating system 20 is coupled to the user by an attachment system 22. In one embodiment, attachment system 22 includes straps, which are secured to torso 12 of user 10. In another embodiment, attachment system 22 includes straps, which secure phase oscillating system 20 to an upper limb 16 or a lower limb 14 of user 10. In yet another embodiment, phase oscillating system 20 is coupled to an exoskeleton or frame, which is coupled to user 10 or worn by user 10. In another embodiment, phase oscillating system 20 is incorporated into a backpack.

Figure 1B:
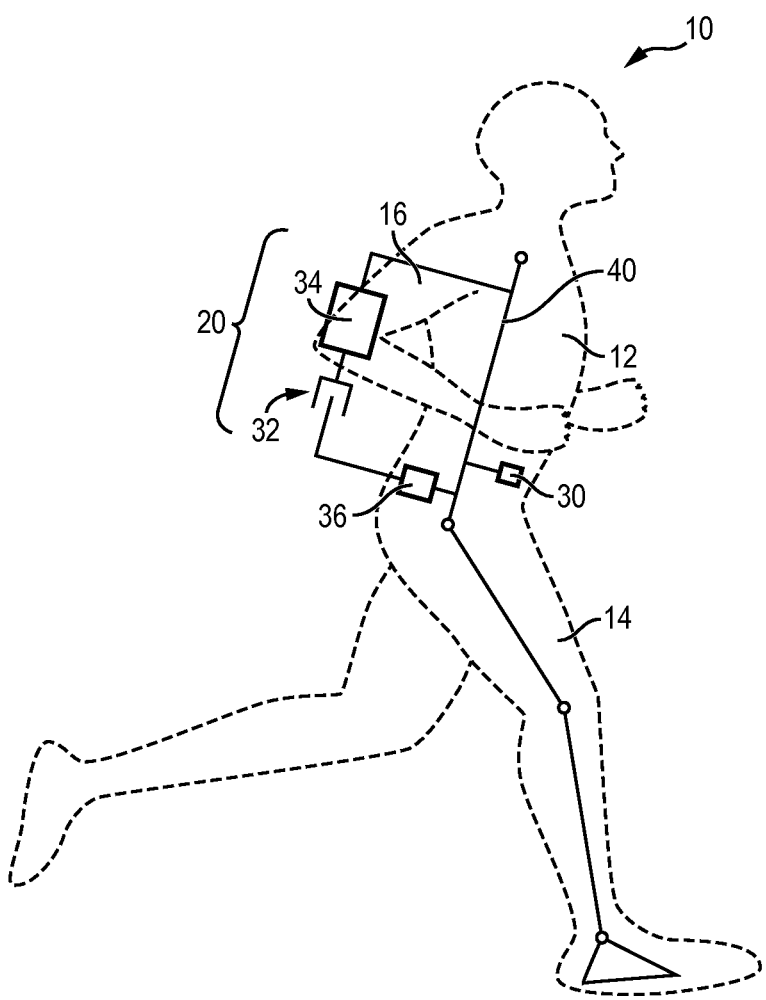

FIG. 1b shows a schematic representation of phase oscillating system 20 worn on torso 12 of user 10. Phase oscillating system 20 includes a sensor 30, an actuator 32, a secondary body 34, and a controller 36. Phase oscillating system 20 is attached to primary body 40. Phase oscillating system 20 operates by oscillating secondary body 34 with respect to primary body 40. Primary body 40 may be torso 12, lower limbs 14, and upper limbs 16, or other body portion of user 10. Primary body 40 is a human, animal, robot, or other object. In one embodiment, torso 12 represents primary body 40.

Phase oscillating system 20 includes a sensor 30 coupled to user 10. Sensor 30 is an accelerometer, vibrometer, rate gyro, potentiometer, inclinometer, or other sensor. Sensor 30 measures a physical state of a primary body 40. The physical state measurement may be linear position, linear velocity, linear acceleration, angular position, rotational or angular velocity, rotational or angular acceleration, or other state measurement. Primary body 40 can be a portion of user 10, such as the torso 12, lower limbs 14, and upper limbs 16, or other body portion of user 10. In one embodiment, sensor 30 is coupled to the torso 12 of user 10.

Phase oscillating system 20 includes an actuator 32 and a secondary mass or secondary body 34. Actuator 32 drives the oscillations of secondary body 34. Actuator 32 includes any suitable system that applies a force to secondary body 34 to cause oscillation or movement of secondary body 34. For example, actuator 32 is a linear actuator, pneumatic cylinder, hydraulic actuator, electromagnetic actuator, or another type of motor. Secondary body 34 is coupled to primary body 40 at any position, for example at torso 12 of user 10. Secondary body 34 may include any type of object, including a solid weight or combination of fluids of different densities. In one embodiment, secondary body 34 is an eccentric mass, and the eccentric mass is rotated to produce a desired external force. In another embodiment, secondary body 34 is a backpack, where the backpack is the oscillating mass in phase oscillating system 20.

Actuator 32 is coupled to secondary body 34 and acts on secondary body 34 to move secondary body 34 in a repetitive motion, such as a horizontal back and forth motion, a vertical up and down motion, a pendulum swing, rotary motion, or other linear or rotational motion. In one embodiment, secondary body 34 is accelerated up and down by actuator 32, and secondary body 34 oscillates up and down to create an external force, which acts on primary body 40. In another embodiment, the reaction force required to hold actuator 32 in place creates the external force on primary body 40.

A controller 36 is coupled to sensor 30 and actuator 32. Controller 36 receives and processes the physical state measurement from sensor 30. Based on the physical state measurement from sensor 30, controller 36 triggers actuator 32 to move secondary body 34. The movement of secondary body 34 produces an external force, which acts on primary body 40. Actuator 32 is engaged or triggered according to the physical state of primary body 40 in order to provide an external force that adds energy to or subtracts energy from the motion of primary body 40. In one embodiment, actuator 32 forces secondary body 34 to oscillate in phase with primary body 40 in order to add energy to the gait step of user 10. In an alternative embodiment, actuator 32 forces secondary body 34 to oscillate out of phase with primary body 40 in order to subtract energy from the gait step of user 10.

In an alternative embodiment, phase oscillating system 20 may include two or more actuators 32 and secondary bodies 34. A first actuator 32 is controlled to operate in phase with a first leg by oscillating a first secondary body 34 in phase with the first leg of user 10. A second actuator 32 is controlled to operate in phase with a second leg by oscillating a second secondary body 34 in phase with the second leg of user 10. The first actuator 32 triggers independently and in opposite phase of the second actuator 32. Similarly, the second actuator 32 triggers independently and in opposite phase of the first actuator 32. Phase oscillating system 20 with two or more actuators 32 and secondary bodies 34 adds energy to the gait of user 10 by oscillating one secondary body 34 in phase with each leg. Alternatively, each of the first and second actuators 32 and secondary bodies 34 may be controlled to oscillate out of phase with the corresponding leg of user 10 in order to hinder the gait cycle for user 10. Therefore, two or more actuators 32 and secondary bodies 34 provide the phase oscillation to increase or decrease the power in the gait cycle of user 10.

Phase oscillating system 20 provides the advantage of adding or subtracting energy when walking, jogging, running, carrying loads, climbing stairs, slopes, or hills, or reducing energy when walking down stairs or hills. Phase oscillating system 20 is also used to increase, maintain, or decrease vibrations in cars, airplanes, or appliances. Phase oscillating system 20 is also used as a mechanical amplifier to increase the energy harvested by energy harvesting devices. Phase oscillating system 20 is also used to alter the motion of a load being carried.

Figure 1C:
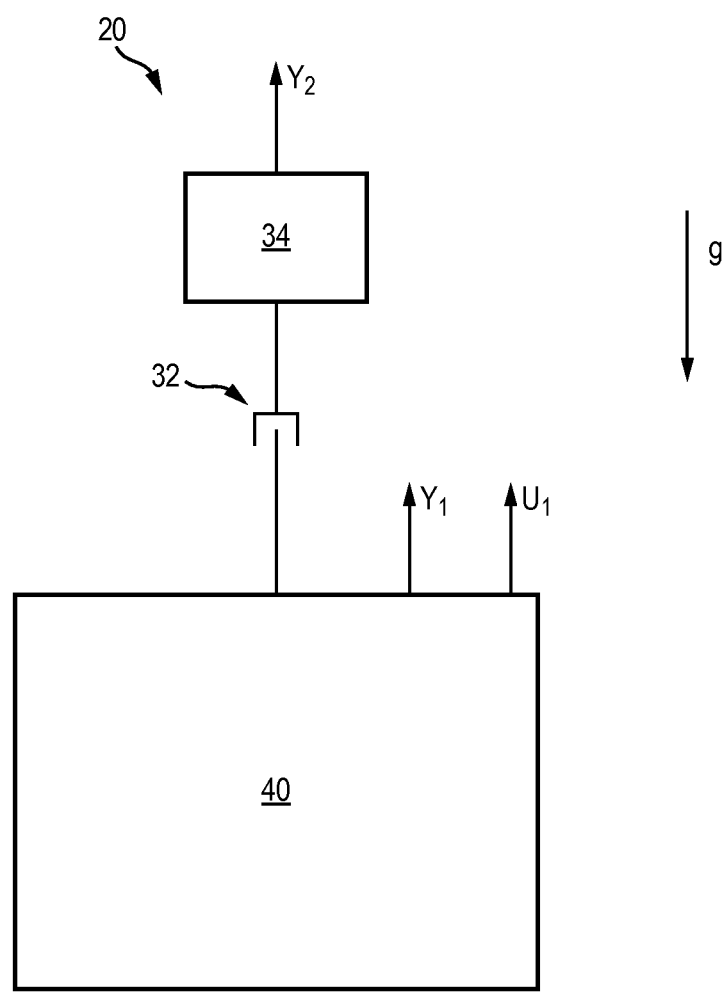

FIG. 1c shows a schematic representation of phase oscillating system 20. The oscillation or movement of secondary body 34 produces external force $U_1$ by pulling on or pushing against primary body 40. Secondary body 34 is oscillated based on the phase angle $\phi_1$ of primary body 40. By oscillating secondary body 34 in phase with respect to primary body 40, energy is added to the motion of primary body 40. By oscillating secondary body 34 out of phase with respect to primary body 40, energy is subtracted from the motion of primary body 40.

Sensor 30 is coupled to primary body 40 to measure a physical state of primary body 40. A physical state of primary body 40 can be described by position $Y_1$, velocity $\dot{Y}_1$, acceleration $\ddot{Y}_1$, or a combination thereof. Sensor 30 detects the acceleration, velocity, or position of primary body 40. Sensor 30 may comprise an accelerometer, vibrometer, rate gyro, or potentiometer. In one embodiment, sensor 30 is an accelerometer attached to primary body 40 to measure acceleration $\ddot{Y}_1$ of primary body 40. The acceleration $\ddot{Y}_1$ is integrated once to determine velocity $\dot{Y}_1$ of primary body 40 and is integrated a second time to determine position $Y_1$ of primary body 40. A phase angle $\phi_1$ of primary body 40 is used to determine the external force $U_1$, which is applied by secondary body 34 to primary body 40. A phase angle $\phi_1$ of primary body 40 is determined by taking the arc tangent of velocity $\dot{Y}_1$ versus position $Y_1$ of primary body 40 and is represented by equation (1).

$$\phi_1 = a\tan 2(\dot{Y}_1, Y_1) \quad (1)$$

Where $\phi_1$=phase angle of primary body 40
$\dot{Y}_1$=velocity of primary body 40
$Y_1$=position of primary body 40

Alternatively, phase angle $\phi_1$ of primary body 40 is determined by taking the arc tangent of acceleration $\ddot{Y}_1$ versus velocity $\dot{Y}_1$ of primary body 40 and is represented by equation (2).

$$\phi_1 = a\tan 2(\ddot{Y}_1, \dot{Y}_1) \quad (2)$$

Where $\phi_1$=phase angle of primary body 40
$\ddot{Y}_1$=acceleration of primary body 40
$\dot{Y}_1$=velocity of primary body 40

In one embodiment, phase angle $\phi_1$ is a kinematic phase angle. A function of phase angle $\phi_1$ is used to determine an external force $U_1$ to apply to primary body 40 and is represented generally by equation (3).

$$U_1 = f(\phi_1) \quad (3)$$

Where $U_1$=external force acting on primary body 40
$\phi_1$=phase angle of primary body 40

In one embodiment, the sine of phase angle $\phi_1$ is the function used to determine the external force $U_1$. The sine of phase angle $\phi_1$ or other function of phase angle $\phi_1$ can be used to create a signal that varies between −1 and 1. The signal can be used to trigger actuator 32. Phase oscillating system 20 provides external force $U_1$ based on the sine of phase angle $\phi_1$ and is represented by equation (4).

$$m\ddot{Y}_1 + b\dot{Y}_1 + kY_1 = c\sin(\phi_1) = \frac{c\dot{Y}_1}{\sqrt{\dot{Y}_1^2 + Y_1^2}} \quad (4)$$

Where: m=mass of primary body 40
$\ddot{Y}_1$=acceleration of primary body 40
b=damping of primary body 40
$\dot{Y}_1$=velocity of primary body 40
k=spring constant of primary body 40
c=constant
$\phi_1$=phase angle of primary body 40
Y=position of primary body 40

A phase lock in amplifier or a phase locked loop is used to synchronize a sine generator from a signal from sensor 30. A phase shift, delay, advance, change in amplitude, or change in sine is used to determine the desired external force $U_1$. By using the sine of phase angle $\phi_1$ to determine external force $U_1$, the energy of phase oscillating system 20 remains bounded and stable.

In another embodiment, the magnitude of the oscillation of secondary body 34 is scaled by modifying equation (4) with a constant f as shown in equation (5).

$$m\ddot{Y}_1 + b\dot{Y}_1 + kY_1 = c\sin(\phi_1) = \frac{c\dot{Y}_1}{\sqrt{\dot{Y}_1^2 + fY_1^2}} \quad (5)$$

In another embodiment, the tangent of phase angle $\phi_1$ is the function used to determine the external force $U_1$. Phase oscillating system 20 provides external force $U_1$ based on the tangent of phase angle $\phi_1$ and is represented by equation (6). By using the tangent of phase angle $\phi_1$ to determine external force $U_1$, the energy of phase oscillating system 20 remains bounded and stable.

$$m\ddot{Y}_1 + b\dot{Y}_1 + kY_1 = c\tan(\phi_1) = \frac{c\dot{Y}_1}{Y_1} \quad (6)$$

In another embodiment, the cosine of phase angle $\phi_1$ is the function used to determine the external force $U_1$. Phase oscillating system 20 provides external force $U_1$ based on the cosine of phase angle $\phi_1$ and is represented by equation (7).

$$m\ddot{Y}_1 + b\dot{Y}_1 + kY_1 = c\cos(\phi_1) = \frac{cY_1}{\sqrt{\dot{Y}_1^2 + Y_1^2}} \quad (7)$$

Cosine of phase angle $\phi_1$ provides a damping system and reduces the energy of phase oscillating system 20. The magnitude of oscillation of secondary body 34 is scaled by modifying equation (7) with a constant f as shown in equation (8).

$$m\ddot{Y}_1 + b\dot{Y}_1 + kY_1 = c\cos(\phi_1) = \frac{c\dot{Y}_1}{\sqrt{\dot{Y}_1^2 + fY_1^2}} \quad (8)$$

The desired external force $U_1$ is divided by a mass of secondary body 34 to determine an acceleration $\ddot{Y}_2$ desired for secondary body 34. The desired acceleration $\ddot{Y}_2$ for secondary body 34 is integrated once to determine a velocity or velocity profile $\dot{Y}_2$ desired for secondary body 34. Actuator 32 applies a force to secondary body 34 such that secondary body 34 moves in accordance with the desired velocity profile $\dot{Y}_2$. In another embodiment, the desired acceleration $\ddot{Y}_2$ of secondary body 34 is integrated twice to determine a position or position profile $Y_2$ desired for secondary body 34, and actuator 32 applies a force to secondary body 34 such that secondary body 34 moves in accordance with the desired position profile $Y_2$.

External force $U_1$ is applied to primary body 40 by the oscillation or motion of secondary body 34 with respect to primary body 40. Secondary body 34 oscillates such that secondary body 34 alternately applies positive and negative external forces $U_1$ on primary body 40. By applying the positive and negative external forces $U_1$ at specific timing, the net effect enhances or increases movement of primary body 40. Alternatively, external force $U_1$ decreases, resists, or limits motion of primary body 40 by applying external force $U_1$ in an opposing direction. In one embodiment, secondary body 34 moves in simple harmonic oscillation. In another embodiment, secondary body 34 moves linearly, circularly, elliptically, or in any other pattern. In an alternative embodiment, external force $U_1$ is applied to a body different than primary body 40. For example, sensor 30 measures a physical state of primary body 40, and phase oscillating system 20 applies external force $U_1$ to another portion of user 10, such as lower limb 14 or upper limb 16.

As secondary body 34 oscillates, the external force $U_1$ applied on primary body 40 by secondary body 34 alternates between a positive and negative force with respect to the direction of movement of primary body 40. A negative velocity or force is referred to in FIG. 1c to be in the same direction of gravity g, and a positive velocity or force is referred to as the opposite direction of gravity g in FIG. 1c. Positive power results when external force $U_1$ is oriented in the same direction as the velocity $\dot{Y}_1$ of primary body 40. Positive power enhances the motion of primary body 40. Negative power results when external force $U_1$ is oriented in the opposite direction as the velocity $\dot{Y}_1$ of primary body 40. Negative power inhibits and dampens the motion of primary body 40.

When secondary body 34 applies a positive force on primary body 40 while primary body 40 is moving with a positive velocity, the positive force of secondary body 34 enhances the movement of primary body 40 by applying positive power. When secondary body 34 applies a negative force on primary body 40 while primary body 40 is moving with a negative velocity, the negative force enhances the movement of primary body 40 by applying positive power. By applying positive power at the correct times based on the phase angle $\phi_1$ of primary body 40, the net effect is to assist movement of primary body 40.

When secondary body 34 applies a positive force on primary body 40 while primary body 40 is moving at a negative velocity, the positive force resists the movement on primary body 40 by applying negative power. When secondary body 34 applies a negative force on primary body 40 and while primary body 40 moves at a positive velocity, the negative force resists the movement of primary body 40 by applying negative power. By applying negative power at the correct times based on the negative of the phase angle, the net effect is to resist movement of primary body 40.

Figure 1D:
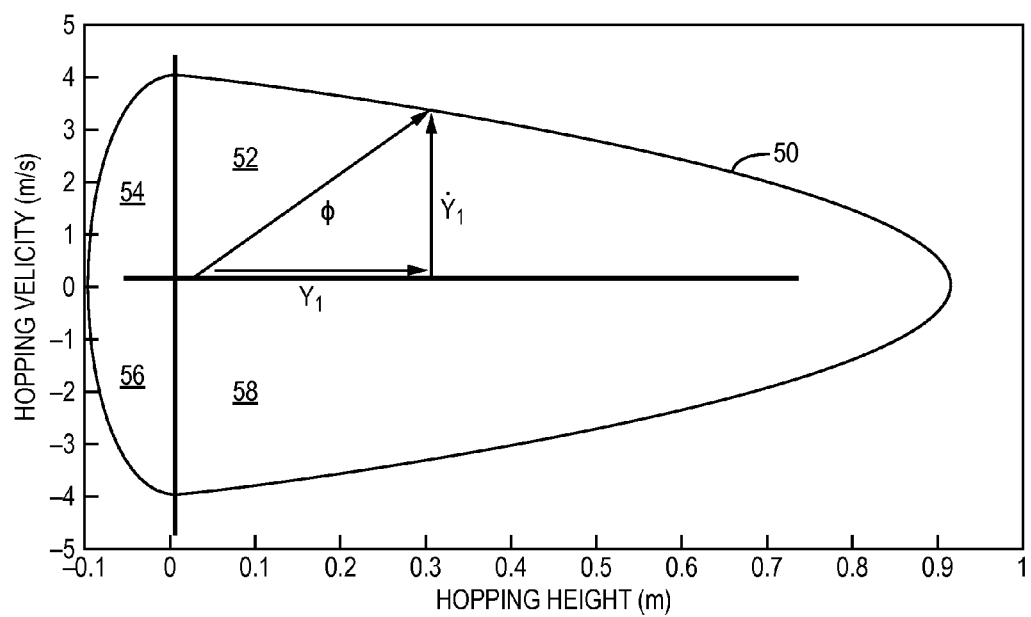

FIG. 1d shows a phase portrait of phase oscillating system 20 for a gait step of user 10. The leg of the human body can be described as a pendulum-like structure with inertia, damping, and a spring stiffness. To enhance the hopping motion of user 10 during gait, phase oscillating system 20 adds a parametric excitation force, external force $U_1$, to produce positive power for primary body 40. The direction of external force $U_1$ is switched at a time and frequency that is tuned in phase with the frequency of the gait step. The phase portrait of a single gait step of user 10 is illustrated by line 50.

Quadrant 52 represents the toe off phase of gait where user 10 has a positive velocity $\dot{Y}_1$ and is moving upwards in the air. To add positive power to the toe off phase for user 10, phase oscillating system 20 provides a positive external force $U_1$. In order to provide a positive external force $U_1$ in quadrant 52, secondary body 34 has a negative velocity $\dot{Y}_2$ and a negative acceleration $\ddot{Y}_2$.

Quadrant 58 represents the phase of gait where user 10 has a negative velocity $\dot{Y}_1$ and is falling back towards the ground. Phase oscillating system 20 provides a negative or downward external force $U_1$ to drive user 10 towards the ground. In order to add positive power in quadrant 58 to the falling phase for user 10, phase oscillating system 20 provides a negative external force $U_1$. In order to provide a negative external force $U_1$ in quadrant 58, secondary body 34 has a negative velocity $\dot{Y}_2$ and a positive acceleration $\ddot{Y}_2$.

Quadrant 56 represents user 10 landing where user 10 continues with a negative velocity $\dot{Y}_1$ toward the ground. Phase oscillating system 20 provides a negative or downward external force $U_1$ to further compress the legs, similar to compressing a spring. In order to add positive power in quadrant 56 phase oscillating system 20 provides a negative external force $U_1$. In order to provide a negative external force $U_1$ in quadrant 56, secondary body 34 has a positive velocity $\dot{Y}_2$ and a positive acceleration $\ddot{Y}_2$.

Quadrant 54 represents user 10 extending the legs and pushing off the ground. In order to add positive power in quadrant 54 to the push off phase of gait for user 10, phase oscillating system 20 provides a positive external force $U_1$. In order to provide a positive external force $U_1$ in quadrant 54, secondary body 34 has a positive velocity $\dot{Y}_2$ and a negative acceleration $\ddot{Y}_2$.

To hinder or dampen the hopping motion of user 10 during gait, phase oscillating system 20 provides a negative power. The direction of external force $U_1$ is switched at a time and frequency that is tuned in anti-phase with the frequency of the gait step. To subtract or absorb energy to the toe off phase for user 10, phase oscillating system 20 provides a positive external force $U_1$ in quadrants 56 and 54 and provides a negative external force $U_1$ in quadrants 52 and 58.

Figure 1E:
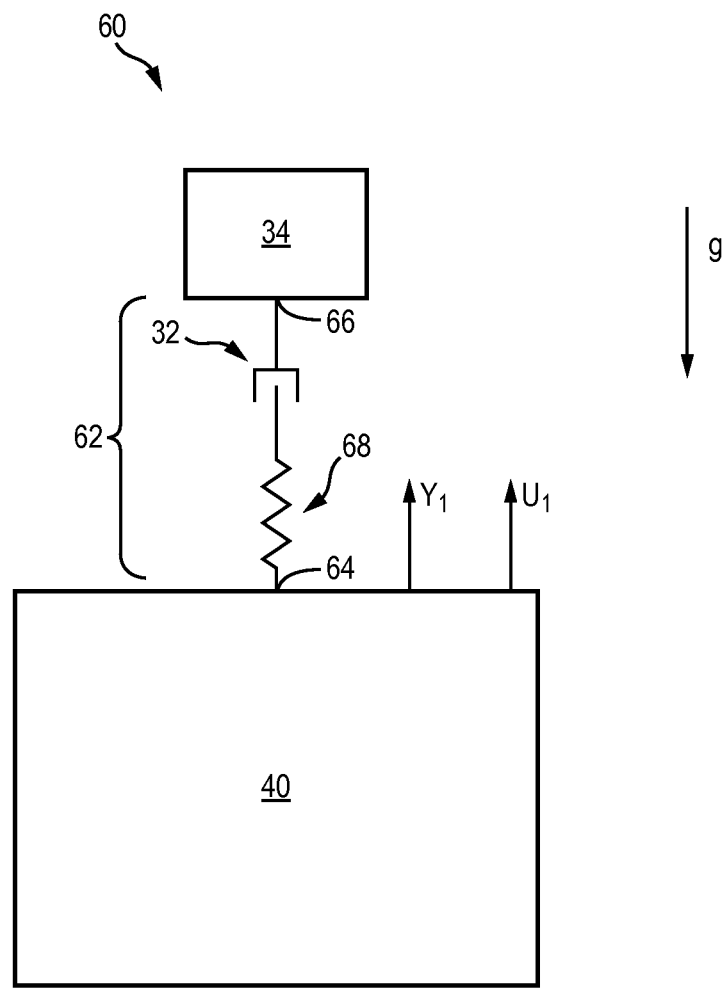

FIG. 1e shows a schematic representation of the motion of an alternative phase oscillating system 60 including a suspension system. Phase oscillating system 60 is similar to phase oscillating system 20 and includes suspension system 62. A suspension system 62 is coupled to primary body 40 at a first end 64 and is coupled to secondary body 34 at a second end 66. Suspension system 62 permits second end 66 to move in relative motion to first end 64. Suspension system 62 includes a plurality of spring forces and damper forces. Suspension system 62 may include springs, air springs, air pistons, dampers, and bumpers. In one embodiment, suspension system 62 includes spring 68, where spring 68 is a compliant element such as a helical or coil spring. Secondary body 34 is coupled to primary body 40 by actuator 32 and spring 68 or a similar mechanism that allows secondary body 34 to oscillate passively with respect to primary body 40. Oscillating secondary body 34 enhances or maintains a limit cycle based on moving secondary body 34 as a function of phase angle $\phi_1$. Alternatively, oscillating secondary body 34 decreases the limit cycle based on moving secondary body 34 as a function of phase angle $\phi_1$.

Suspension system 62 assists secondary body 34 in increasing the vertical up and down motion of primary body 40 relative to the ground. Secondary body 34 coupled to second end 66 of suspension system 62 moves relative to the ground and relative to first end 64 in phase with primary body 40. Suspension system 62 thereby increases the up and down motion of primary body 40 relative to the ground. Secondary body 34 coupled to second end 66 moves up relative to first end 64 when first end 64 moves downward relative to the ground, and moves down relative to said first end 64 when first end 64 moves upward relative to the ground. Suspension system 62 thereby increases the up and down motion of primary body 40 relative to the ground. Secondary body 34 coupled to second end 66 moves up and accelerates up when primary body 40 touches the ground, moves up and accelerates down when primary body 40 pushes off the ground, moves down and accelerates down when primary body 40 moves up in the air, and moves down and accelerate up when primary body 40 falls in the air. In another embodiment, the motion of primary body 40 and secondary body 34 is non-vertical and can be in any direction. Suspension system 62 thereby enhances, increases, or assists the motion of primary body 40.

In an alternative embodiment, suspension system 62 assists secondary body 34 in decreasing or reducing the vertical up and down motion of primary body 40 relative to the ground. Secondary body 34 coupled to second end 66 moves relative to the ground and relative to first end 64 out of phase with primary body 40 and thereby decreases the up and down motion of primary body 40 relative to the ground. Secondary body 34 coupled to second end 66 moves down relative to first end 64 when first end 64 moves downward relative to the ground, and moves up relative to first end 64 when first end 64 moves upward relative to the ground, thereby decreasing or reducing the up and down motion of primary body 40 relative to the ground. Secondary body 34 coupled to second end 66 moves down and accelerates down when primary body 40 coupled to first end 64 touches the ground, moves down and accelerates up when primary body 40 pushes off the ground, moves up and accelerates up when primary body 40 moves up in the air, and moves up and accelerates down when primary body 40 falls in the air, thereby reducing or decreasing the motion of primary body 40. In another embodiment, the motion of primary body 40 and secondary body 34 is non-vertical and can be in any direction.

Phase oscillating system 20 enhances human motion and reduces the metabolic cost of motion. Phase oscillating systems 20 and 60 assist at different speeds of motion, because a continuous control signal is generated and used as a triggering mechanism. For example, phase oscillating systems 20 and 60 smoothly transition from walking to running and back to walking. Phase oscillating systems 20 and 60 provide a bounded energy and works for linear and rotary systems. Alternatively, phase oscillating system 20 provides a damping of energy to hinder motion, which is useful in exercise or training applications and during downhill walking and running.

Figure 1F:
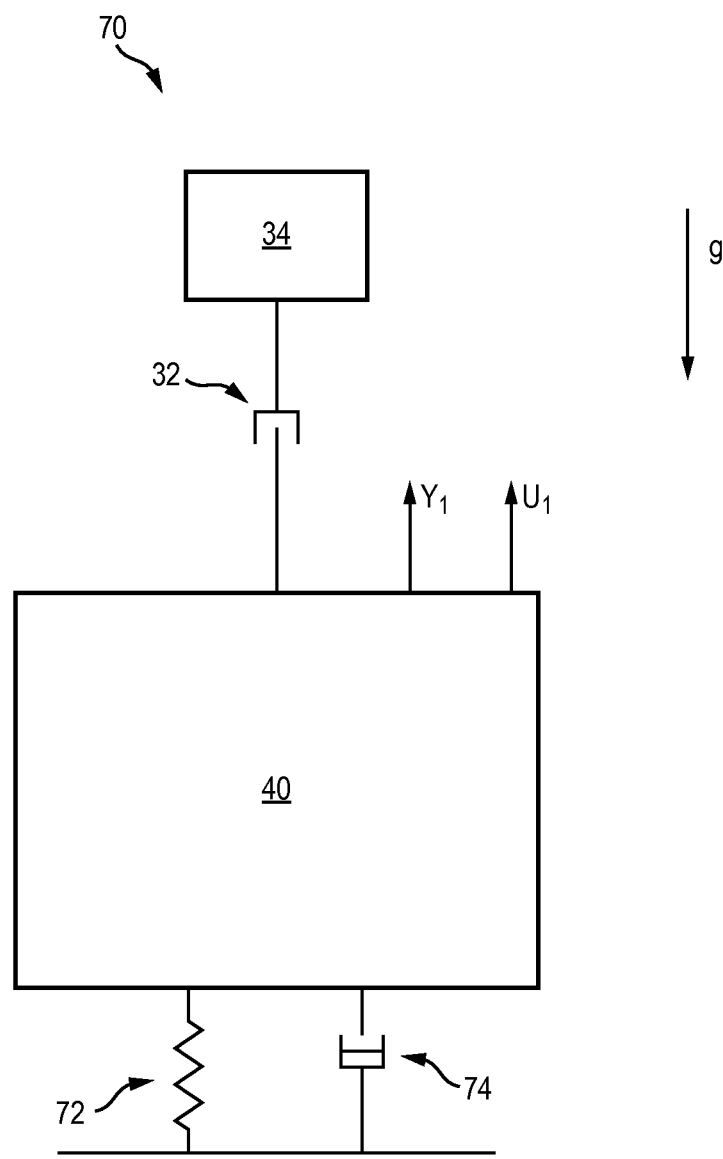

FIG. 1f shows a schematic representation of the motion of an alternative phase oscillating system 70 that harvests energy from a damper. Phase oscillating system 70 optionally includes a spring 72 and a damper 74 coupled to primary body 40. One or more dampers 74 may be coupled to primary body 40. Dampers 74 harvest energy from the motion of primary body 40. Dampers 74 harvest energy expended by phase oscillating system 70. The harvested energy is stored for use by phase oscillating system 70 or by another device at a future time. In one embodiment, secondary body 34 is oscillated at a rate to increase the amount of energy harvested from damper 74.

Figure 2A:
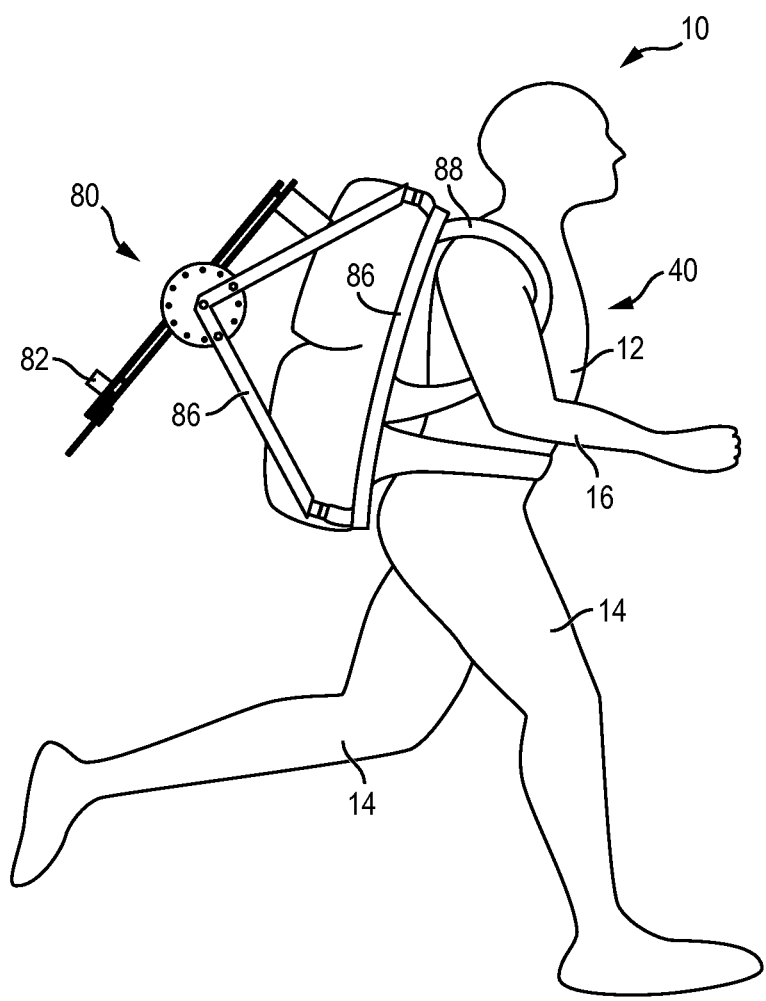
FIGS. 2a-2c illustrate an alternative wearable phase oscillating system.
Figure 2B:
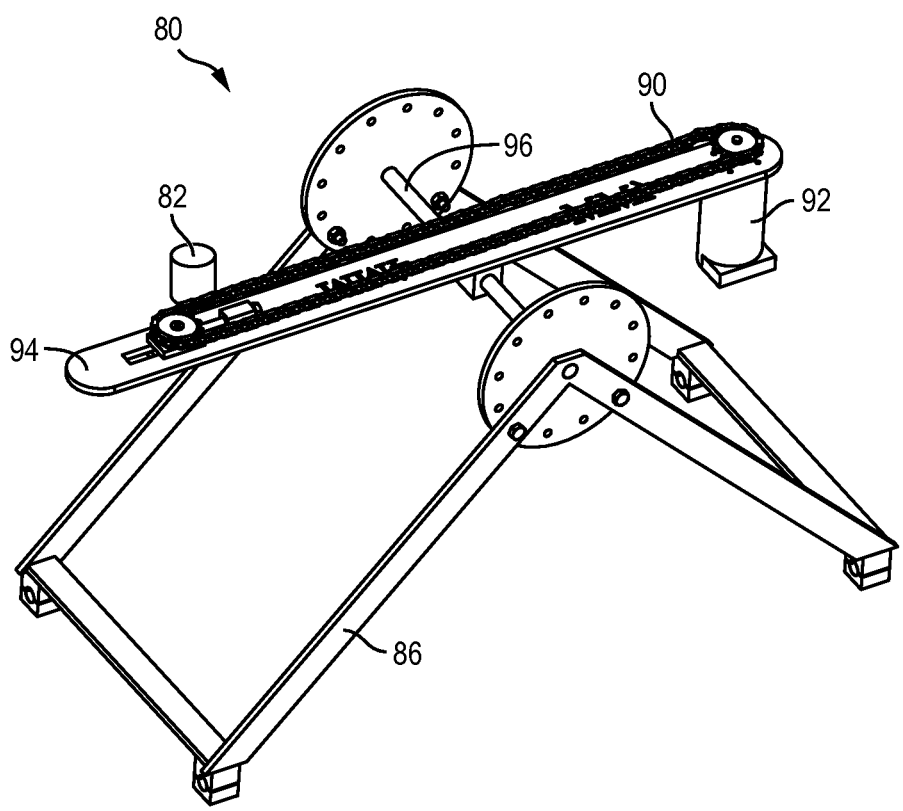
Figure 2C:
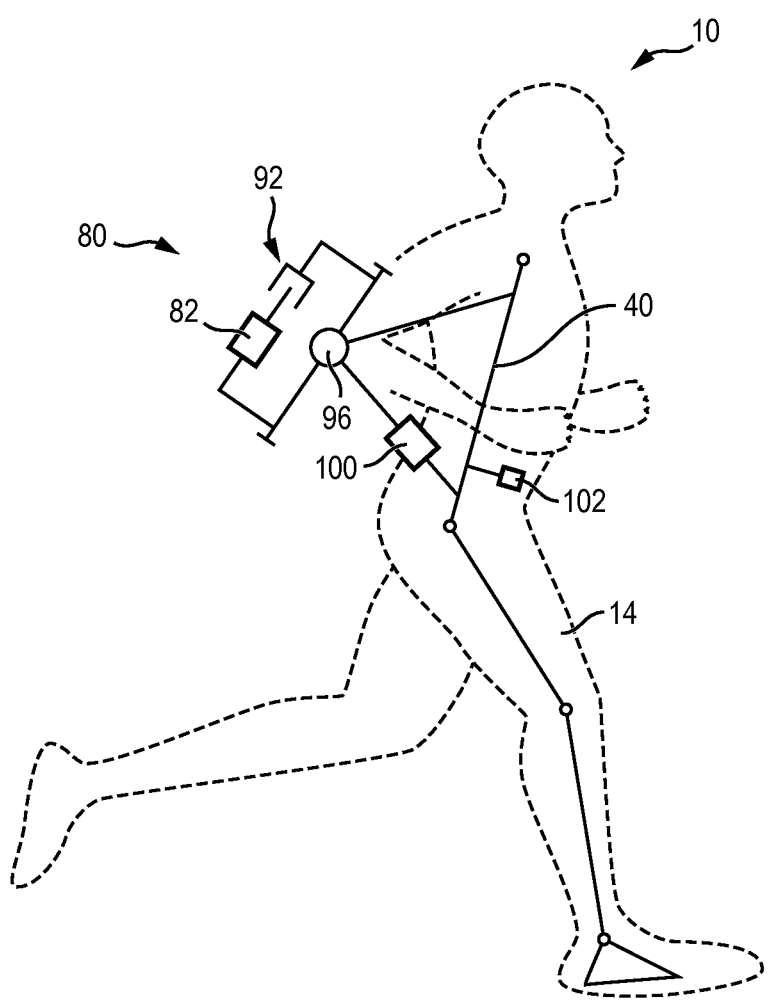

FIGS. 2a-2c show another phase oscillating system, which oscillates in any direction or angle with respect to the ground. FIG. 2a shows phase oscillating system 80. Phase oscillating system 80 is similar to phase oscillating system 20 in that phase oscillating system 80 is a device that oscillates a secondary body or secondary mass 82, which applies an external force to primary body 40. Additionally, phase oscillating system 80 can be positioned at any angle with respect to user 10 and the direction of motion of user 10.

Phase oscillating system 80 is coupled to primary body 40. User 10 is the primary body 40 in phase oscillating system 80. The external forces created by phase oscillating system 80 act on primary body 40, user 10. The force applied to user 10 by phase oscillating system 80 increases or decreases the power of the user's motion. User 10 wears phase oscillating system 80, or phase oscillating system 80 is coupled to the user by an attachment system. In one embodiment, the attachment system includes a frame 86 and straps 88, which are secured to torso 12 of user 10. In another embodiment, the attachment system includes straps, which secure phase oscillating system 80 to an upper limb 16 or a lower limb 14 of user 10. In yet another embodiment, phase oscillating system 80 is coupled to an exoskeleton, which is coupled to user 10 or worn by user 10.

FIG. 2b shows phase oscillating system 80. In one embodiment, phase oscillating system 80 is a belt system and includes secondary body 82, belt 90, actuator 92, and tensioner 94. Belt 90 may include a chain, rope, or any other device capable of rotating about a tensioner 94. Actuator 92 drives belt 90. Secondary body 82 is coupled to belt 90 and actuator 92 such that secondary body 82 moves in conjunction with belt 90. Belt 90 may move secondary body 82 in a circular, elliptical, pendulum, vertical up and down, horizontal side to side, or other motion in any direction. Alternatively, phase oscillating system 80 includes any suitable system that applies a force to secondary body 82 to cause oscillation or movement of secondary body 82. For example, actuator 92 is a linear actuator, pneumatic cylinder, hydraulic actuator, electromagnetic actuator, or another type of motor. Secondary body 82 may include any type of object, including a solid weight or combination of fluids of different densities. In one embodiment, secondary body 84 is an eccentric mass, and the eccentric mass is rotated to produce a desired external force. In another embodiment, secondary body 82 is a backpack, where the backpack is the oscillating mass in phase oscillating system 80.

Phase oscillating system 80 includes axle 96, which allows phase oscillating system 80 to be rotated about axle 96 and positioned at any angle with respect to user 10. Secondary body 82, belt 90, actuator 92, and tensioner 94 are mounted at a selected angle on axle 96. Phase oscillating system 80 is mounted to user 10 to increase or decrease the energy of the user's motion.

FIG. 2c shows a schematic representation of phase oscillating system 80. Phase oscillating system 80 is coupled to primary body 40 to assist or resist movement of primary body 40. Phase oscillating system 80 operates similarly to phase oscillating system 20, except that the axis along which secondary body 82 moves, the direction of motion of secondary body 82, is adjustable. Phase oscillating system 80 may be positioned at any suitable angle relative to primary body 40 to assist or resist movement of primary body 40.

Phase oscillating system 80 further includes secondary body 82, actuator 92, controller 100, and sensor 102. Sensor 102 is an accelerometer, vibrometer, rate gyro, potentiometer, inclinometer, or other sensor. Sensor 102 measures a physical state of primary body 40. The physical state measurement may be linear position, linear velocity, linear acceleration, angular position, rotational or angular velocity, rotational or angular acceleration, or other state measurement. Primary body 40 can be a portion of user 10, such as the torso 12, lower limbs 14, and upper limbs 16, or other body portion of user 10. In one embodiment, sensor 102 is coupled to the torso 12 of user 10.

Controller 100 is coupled to sensor 102 and actuator 92. Controller 100 receives and processes a physical state measurement from sensor 102. Based on the physical state measurement from sensor 102, controller 100 triggers actuator 92 to move secondary body 82. The movement of secondary body 82 produces an external force, which acts on primary body 40. Actuator 92 is engaged or triggered according to the physical state of primary body 40 in order to provide an external force that adds energy to or subtracts energy from the motion of primary body 40. In one embodiment, actuator 92 forces secondary body 82 to oscillate in phase with primary body 40 in order to add energy to the gait step of user 10. In an alternative embodiment, actuator 92 forces secondary body 82 to oscillate out of phase with primary body 40 in order to subtract energy from the gait step of user 10.

Phase oscillating system 80 enhances human motion and reduces the metabolic cost of motion. Phase oscillating system 80 assists different speeds of motion, because a continuous control signal is generated and used as a triggering mechanism. For example, phase oscillating system 80 smoothly transitions from walking to running and back to walking. Phase oscillating system 80 provides a bounded energy and works for linear and rotary systems. Alternatively, phase oscillating system 80 provides a damping of energy to hinder motion, which is useful in exercise or training applications and during downhill walking and running.

Figure 3A:
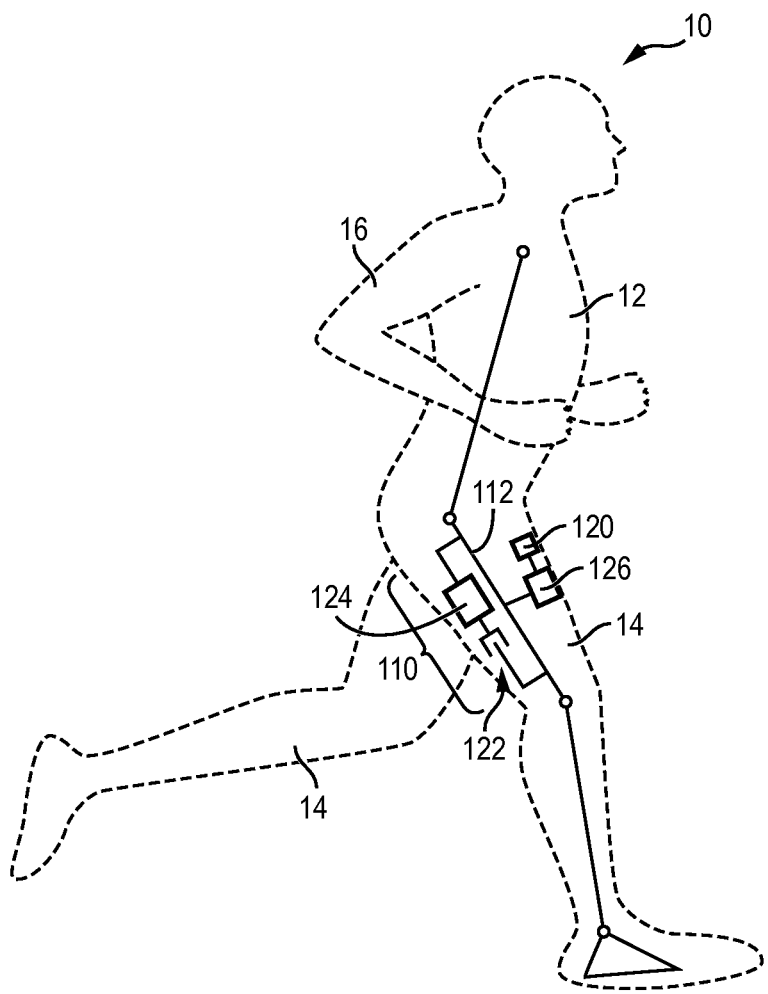
FIGS. 3a-3c illustrate a phase oscillating system worn on a limb of a user.
Figure 3B:
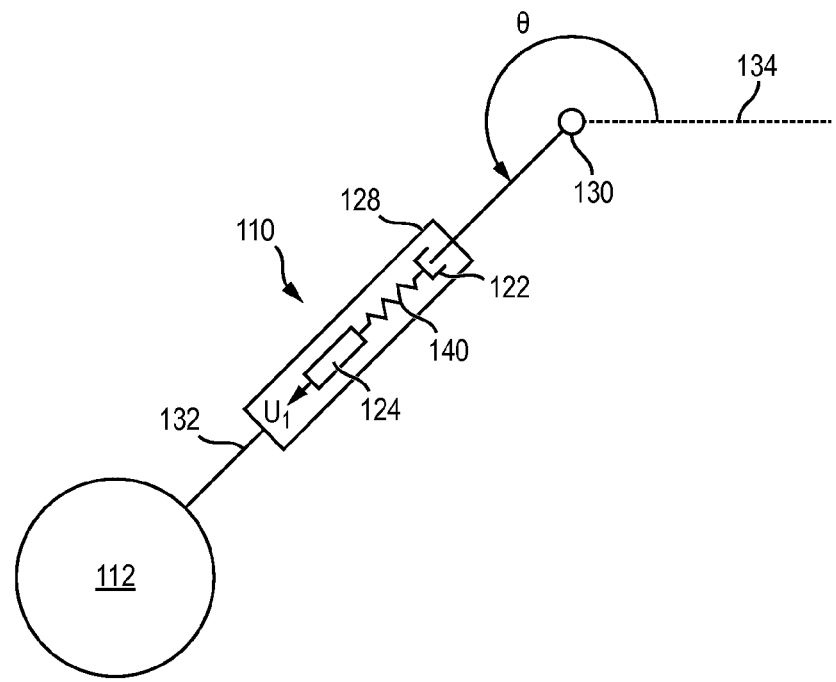
Figure 3C:
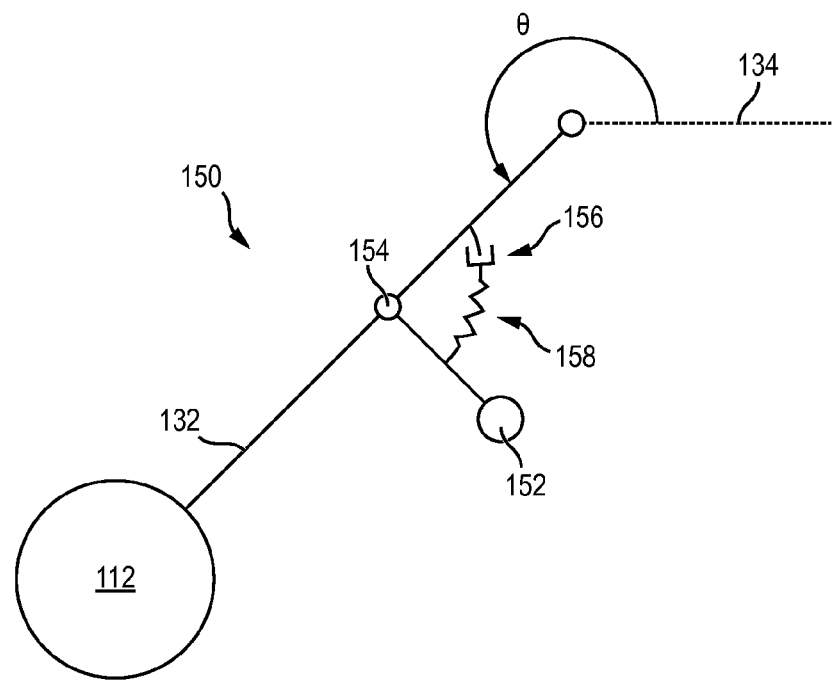

FIGS. 3a-3c show a schematic representation of a phase oscillating system worn on the limb of the user. FIG. 3a shows phase oscillating system 110, which is similar to phase oscillating system 20 or 80 and is coupled to primary body 112. Primary body 112 may include any suitable body. Phase oscillating system 110 is coupled to user 10 or is worn on any portion of user 10. In one embodiment, primary body 112 is lower limb 14 of user 10. Alternatively, phase oscillating system 110 is coupled to any primary body, which can be a human, animal, robot, or other object.

Phase oscillating system 110 includes sensor 120, actuator 122, secondary body 124, and controller 126. Sensor 120 is an accelerometer, vibrometer, rate gyro, potentiometer, inclinometer, or other sensor. Sensor 120 measures a physical state of primary body 112. The physical state measurement may be linear position, linear velocity, linear acceleration, angular position, rotational or angular velocity, rotational or angular acceleration, or other state measurement. In an alternative embodiment, sensor 120 measure the physical state of another portion of user 10 different than primary body 112. Actuator 122 drives the oscillations of secondary body 124 according to the physical state of primary body 112. Actuator 122 includes any suitable system that applies a force to secondary body 124 to cause oscillation or movement of secondary body 124. For example, actuator 122 is a linear actuator, pneumatic cylinder, hydraulic actuator, electromagnetic actuator, or another type of motor. Secondary body 124 may include any type of object, including a solid weight or combination of fluids of different densities. In one embodiment, secondary body 124 is an eccentric mass, and the eccentric mass is rotated to produce a desired external force.

Controller 126 includes a microprocessor coupled to sensor 120 and actuator 122. Controller 126 receives and processes a physical state measurement signal from sensor 120. Based on the physical state measurement from sensor 120, controller 126 triggers actuator 122 to move secondary body 124. The movement of secondary body 124 produces an external force, which acts on primary body 112. In one embodiment, actuator 122 forces secondary body 124 to oscillate in phase with primary body 112 in order to add energy to the gait step of user 10. In an alternative embodiment, actuator 122 forces secondary body 124 to oscillate out of phase with primary body 112 in order to subtract energy from the gait step of user 10.

FIG. 3b shows a schematic diagram of the operation of phase oscillating system 110. Primary body 112 moves or rotates with respect to pivot point 130. Pivot point 130 represents a pivot point for primary body 112, such as the hip joint of user 10. Secondary body 124 is disposed within a link 132 that couples primary body 112 to pivot point 130. Secondary body 124 oscillates linearly with respect to primary body 112 and pivot point 130, while primary body 112 and link 132 rotate with respect to pivot point 130. The oscillation or movement of secondary body 124 produces external force $U_1$, which acts on primary body 112.

Secondary body 124 driven by actuator 122 using electric energy, pneumatic energy, or any other type of energy. Phase oscillating system 110 includes an optional suspension system 140 coupled to secondary body 124. Suspension system 140 permits secondary body 124 to move in relative motion to pivot point 130 and primary body 112. Suspension system 140 includes a plurality of spring forces and damper forces. Suspension system 140 may include springs, air springs, air pistons, dampers, and bumpers. In one embodiment, suspension system 140 includes a compliant element such as a helical or coil spring.

Sensor 120 is coupled to primary body 112 to measure a physical state of primary body 112. A physical state of primary body 112 can be described by angular position $\theta$, angular velocity $\dot{\theta}$, angular acceleration $\ddot{\theta}$, or a combination thereof. Sensor 120 may detect the angular velocity $\dot{\theta}$ of primary body 112 at lower limb 14 of user 10. Alternatively, sensor 120 may further detect the angular acceleration $\ddot{\theta}$ of primary body 112 at lower limb 14 of user 10. In one embodiment, sensor 120 is an accelerometer coupled to primary body 112 to measure angular acceleration $\ddot{\theta}$ of primary body 112. The angular velocity $\dot{\theta}$ is determined by taking the integral of angular acceleration $\ddot{\theta}$ of primary body 112, and angular position $\theta$ is determined by taking the integral of angular velocity $\dot{\theta}$. Angular position $\theta$ of primary body 112 may be defined as the angle that primary body 112 makes relative to a plane 134. In one embodiment, plane 134 is horizontal to the ground.

A phase angle $\phi$ of primary body 112 is used to determine the external force $U_1$, which is applied by secondary body 124 to primary body 112. Secondary body 124 is oscillated based on the phase angle $\phi$ of primary body 112. By oscillating secondary body 124 in phase with respect to primary body 112, energy is added to the motion of primary body 112. By oscillating secondary body 124 out of phase with respect to primary body 112, energy is subtracted from the motion of primary body 112. A phase angle φ of primary body 112 is determined by taking the arc tangent of angular velocity $\dot{\theta}$ versus angular position θ of primary body 112 and is represented by equation (9).

$$\phi = a\tan 2(\dot{\theta}, \theta) \quad (9)$$

Where φ=phase angle of primary body 112
$\dot{\theta}$=angular velocity of primary body 112
θ=angular position of primary body 112

Alternatively, phase angle φ of primary body 112 is determined by taking the arc tangent of angular acceleration $\ddot{\theta}$ versus angular velocity $\dot{\theta}$ of primary body 112 and is represented by equation (10).

$$\phi = a\tan 2(\ddot{\theta}, \dot{\theta}) \quad (10)$$

Where φ=phase angle of primary body 112
$\ddot{\theta}$=angular acceleration of primary body 112
$\dot{\theta}$=angular velocity of primary body 112

In one embodiment, phase angle φ is a kinematic phase angle. A function of phase angle φ is used to determine an external force $U_1$ to apply to primary body 112 and is represented generally by equation (11).

$$U_1 = f(\phi) \quad (11)$$

Where $U_1$=external force acting on primary body 112
φ=phase angle of primary body 112

In one embodiment, the sine of phase angle $\phi_1$ is the function used to determine the external force $U_1$. The function of phase angle $\phi_1$ can be used to create a signal that varies between −1 and 1. The signal can be used to trigger actuator 122. Phase oscillating system 110 provides external force $U_1$ based on the sine of phase angle φ and is represented by equation (12).

$$I\ddot{\theta} + b\dot{\theta} + k\theta = c\sin(\phi) = \frac{c\dot{\theta}}{\sqrt{\dot{\theta}^2 + \theta^2}} \quad (12)$$

Where: I=inertia of primary body 112
$\ddot{\theta}$=angular acceleration of primary body 112
b=damping of primary body 112
$\dot{\theta}$=angular velocity of primary body 112
k=spring constant of primary body 112
c=constant
φ=phase angle of primary body 112
θ=angular position of primary body 112

A phase lock in amplifier or a phase locked loop is used to synchronize a sine generator from a signal from sensor 120. A phase shift, delay, advance, change in amplitude, or change in sine is used to determine the desired external force $U_1$. By using the sine of phase angle φ to determine external force $U_1$, the energy of phase oscillating system 110 remains bounded and stable.

In another embodiment, the magnitude of the oscillation of secondary body 124 is scaled by modifying equation (12) with a constant f, similarly to equation (5). In another embodiment, the tangent of phase angle φ is the function used to determine the external force $U_1$. By using the tangent of phase angle φ to determine external force $U_1$, the energy of phase oscillating system 110 remains bounded and stable. In yet another embodiment, the cosine of phase angle φ is the function used to determine the external force $U_1$. Cosine of phase angle φ provides a damping system and reduces the energy of phase oscillating system 110. The magnitude of oscillation of secondary body 124 is scaled by modifying equation (12) with a constant f, similarly to equation (8).

External force $U_1$ is applied to primary body 112 by the oscillation or motion of secondary body 124 with respect to primary body 112. Secondary body 124 oscillates such that secondary body 124 alternately applies positive and negative external forces $U_1$ on primary body 112. By applying the positive and negative external forces $U_1$ at specific timing, the net effect enhances or increases movement of primary body 112. Alternatively, external force $U_1$ decreases, resists, or limits motion of primary body 112 depending on the direction of external force $U_1$ applied to primary body 112. In one embodiment, secondary body 124 moves in simple harmonic oscillation. In another embodiment, secondary body 124 moves linearly, circularly, elliptically, or in any other pattern.

The leg of the human body can be described as a pendulum-like structure with inertia, damping, and a spring stiffness. To enhance add power to user 10 during gait, phase oscillating system 110 enhances the pendulum motion of lower limb 14. The direction of external force $U_1$ is switched at a time and frequency that is tuned in phase with the frequency of the gait step. A plurality of phase oscillating systems 110 can be attached to user 10. For example, one phase oscillating system 110 is attached to each lower limb 14, and each phase oscillating system 110 is tuned in phase with one lower limb 14. Phase oscillating system 110 may also include a damper placed at the hip, pivot point 130, to harvest energy.

Phase oscillating system 110 enhances human motion and reduces the metabolic cost of motion. Phase oscillating system 110 assists different speeds of motion, because a continuous control signal is generated and used as a triggering mechanism. For example, phase oscillating system 110 smoothly transitions from walking to running and back to walking. Phase oscillating system 110 provides a bounded energy and works for linear and rotary systems. Alternatively, phase oscillating system 110 provides a damping of energy to hinder motion, which is useful in exercise or training applications and during downhill walking and running.

FIG. 3c shows an alternative phase oscillating system 150. Phase oscillating system 150 is similar to phase oscillating system 110, except that phase oscillating system 150 includes a swinging or rotating a secondary mass or secondary body 152. Secondary body 152 is coupled to primary body 112 at any suitable point on primary body 112. In one embodiment, secondary body 152 is coupled to primary body 112 at point 154. An actuator 156 applies a torque to secondary body 152.

The appropriate torque may be determined based on a function of the phase angle and the mass of secondary body 152. By applying torque at the appropriate time, secondary body 152 assists locomotion of primary body 112. In one embodiment, the torque from actuator 156 causes secondary body 152 to swing in a pendulum motion. In another embodiment, the torque from actuator 156 causes secondary body 152 to complete full revolutions about point 154. In one embodiment, the period of the swing of secondary body 152 may be substantially similar to a frequency of motion of primary body 112. In another embodiment, the period may be offset in order to maximize the locomotive effect. In yet another embodiment, the period of secondary body 152 may be shorter or longer than the period of primary body 112.

Phase oscillating system 150 includes an optional suspension system 158 coupled to secondary body 124. Suspension system 158 may include a plurality of spring forces and damper forces. Suspension system 158 may include springs, air springs, air pistons, dampers, and bumpers. In one embodiment, suspension system 158 includes a compliant element such as a helical or coil spring. Suspension system 158 is coupled to link 132 and to secondary body 152. In one embodiment, secondary body 152 is an offset eccentric mass and suspension system 158 permits secondary body 152 to move in relative motion to link 132.

Phase oscillating system 150 may be mounted on torso 12 of user 10 or may be coupled to other portions of the user's body. Phase oscillating system 150 applies a torque to alter body motion by adding or subtracting energy based on the motion of primary body 112, user 10. Phase oscillating system 150 adds or subtracts rotational kinetic energy to primary body 112.

Figure 4A:
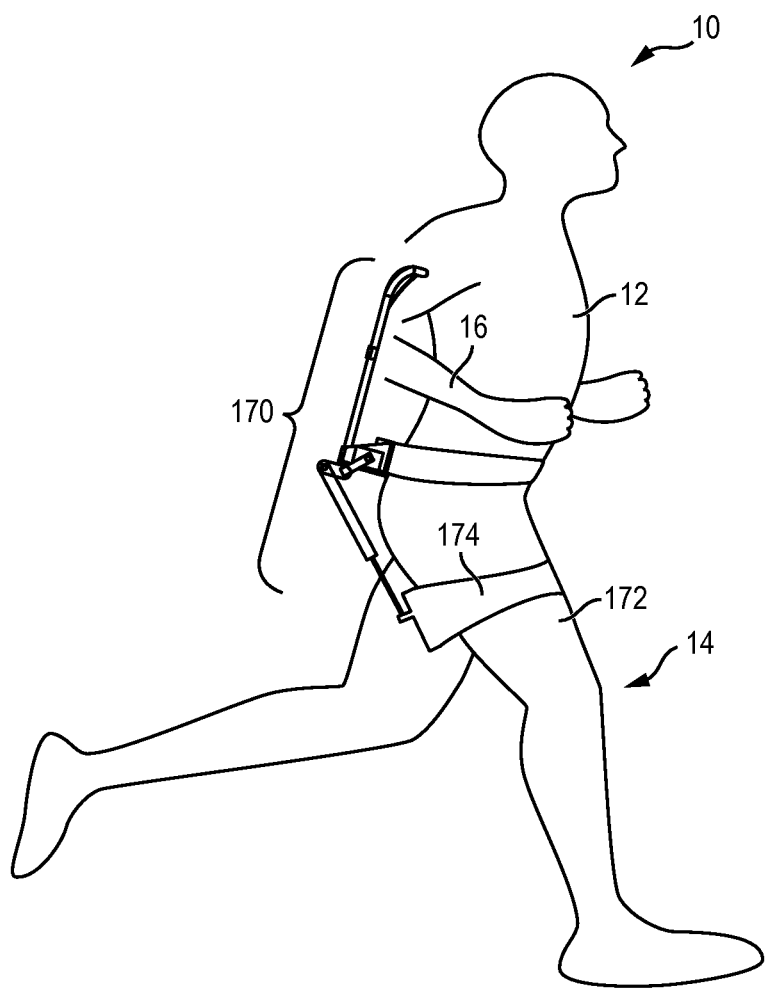
FIGS. 4a-4e illustrate a phase oscillating system worn on the hip of a user.

FIGS. 4a-4e show a phase oscillating system worn on the hip of the user. FIG. 4a shows phase oscillating system 170 worn by user 10. Phase oscillating system 170 applies a direct oscillating torque to a joint of user 10. The leg of the human body can be described as a pendulum-like structure with inertia, damping, and a spring stiffness. To enhance the pendulum motion of user's lower limbs 14, a parametric excitation torque is added by phase oscillating system 170. User 10 wears phase oscillating system 170 on upper leg or thigh 172. The direction of the torque provided by phase oscillating system 170 is switched at the correct timing and frequency to be tuned with the gait frequency of user 10.

Phase oscillating system 170 is coupled to the user by an attachment system 174. In one embodiment, attachment system 174 includes straps, which are secured to thigh 172 of user 10. In another embodiment, attachment system 174 includes straps, which secure phase oscillating system 170 to another portion of user 10, such as upper limb 16. In yet another embodiment, phase oscillating system 170 is coupled to an exoskeleton or frame, which is coupled to user 10 or worn by user 10.

Figure 4B:
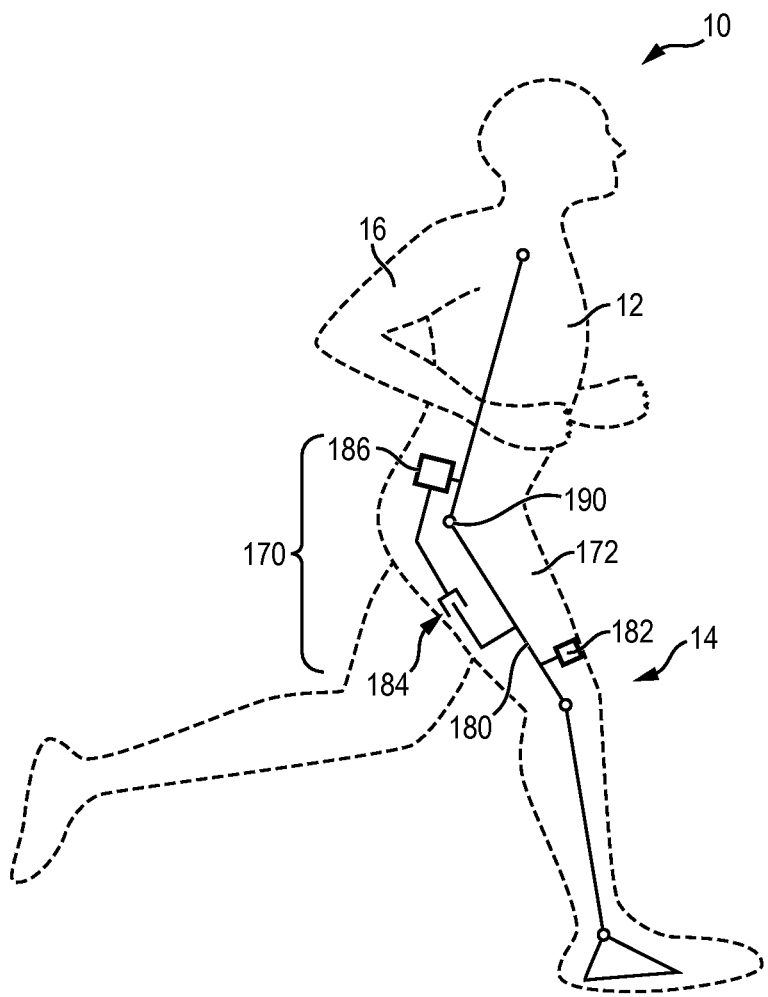

FIG. 4b shows a schematic representation of phase oscillating system 170 worn on thigh 172 of user 10. Phase oscillating system 170 is attached to primary body 180, which is lower limb 14. Phase oscillating system 170 includes a sensor 182, an actuator 184, and a controller 186. Phase oscillating system 170 operates by oscillating the force of actuator 184 back and forth with respect to primary body 180. Actuator 184 produces a direct torque at hip joint 190 by pulling on or pushing against primary body 180. The external forces produced by phase oscillating system 170 act on user 10 at the hip joint 190 to rotate lower limb 14 about hip joint 190.

Phase oscillating system 170 includes a sensor 182 coupled to user 10. Sensor 182 is an accelerometer, vibrometer, rate gyro, potentiometer, inclinometer, or other sensor. Sensor 182 measures a physical state of a primary body 180. The physical state measurement may be linear position, linear velocity, linear acceleration, angular position, rotational or angular velocity, rotational or angular acceleration, or other state measurement. A controller 186 is coupled to sensor 182 and actuator 184. Controller 186 receives and processes the physical state measurement from sensor 182. Based on the physical state measurement from sensor 182, controller 186 triggers actuator 184. Actuator 184 includes any suitable system that applies a force or torque to primary body 180 that assists or restricts movement of primary body 180. For example, actuator 184 is a linear actuator, pneumatic cylinder, hydraulic actuator, electromagnetic actuator, air ratchet, fly wheel with motor, or another type of linear or rotary motor.

Figure 4C:
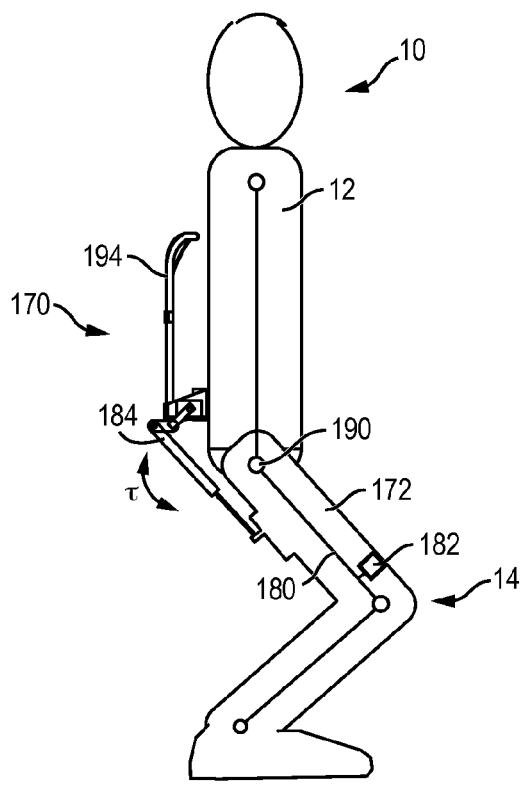

FIG. 4c shows phase oscillating system 170 worn by user 10. Phase oscillating system 170 is incorporated into exoskeleton 194, which is coupled to user 10 or worn by user 10. A torque τ is applied by actuator 184 at hip joint 190. In one embodiment, a force is applied by actuator 184 to lower limb 14 or thigh 172 to produce a torque at hip joint 190. Alternatively, torque at hip joint 190 is applied directly to user 10 at hip joint 190.

Figure 4D:
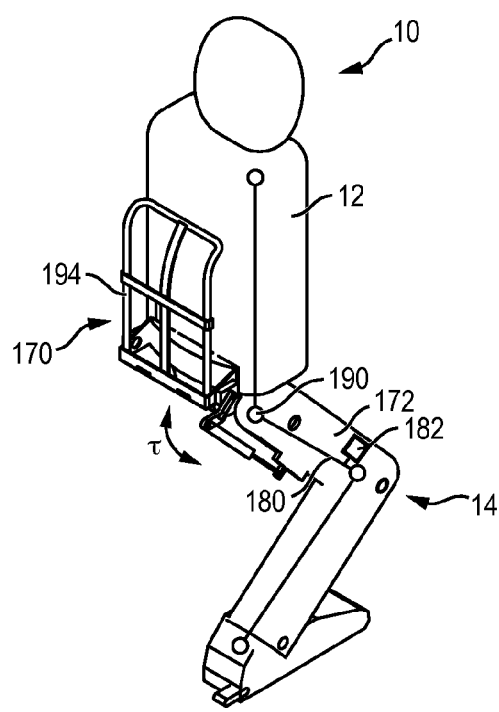

FIG. 4d shows an isometric view of phase oscillating system 170 worn by user 10 with exoskeleton 194. Torque τ is applied by actuator 184 to primary body 180 at hip joint 190. In one embodiment, actuator 184 applies τ in phase with primary body 180 in order to add energy to the gait step of user 10. In an alternative embodiment, actuator applies 184 torque τ out of phase with primary body 180 in order to subtract energy from the gait step of user 10.

A plurality of phase oscillating systems 170 can be attached to exoskeleton 194 or user 10. For example, one phase oscillating system 170 is attached to each lower limb 14, and each phase oscillating system 170 is tuned in phase with one lower limb 14. Phase oscillating system 170 may also include a damper placed at the hip, pivot point 130, to harvest energy.

Figure 4E:
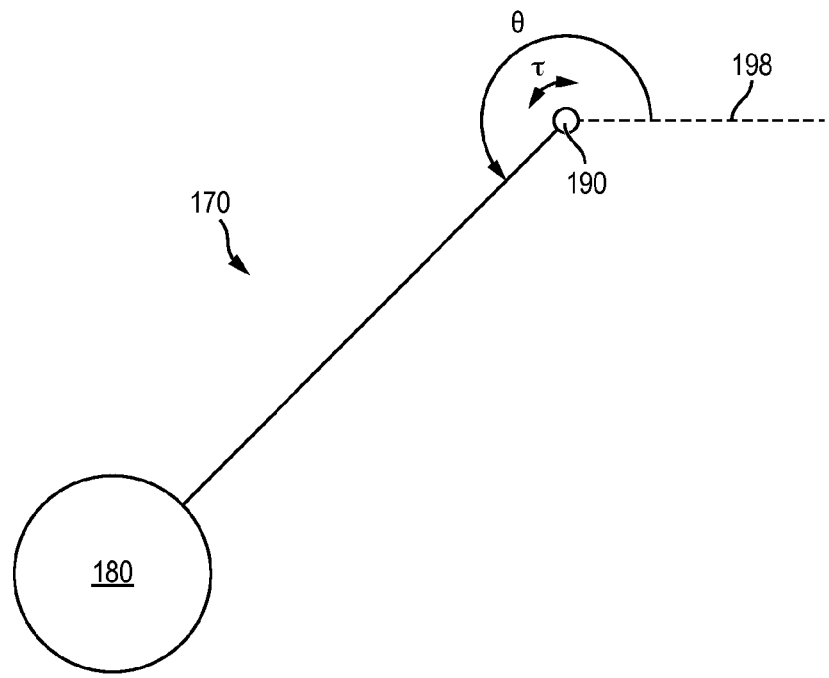

FIG. 4e shows a schematic representation of phase oscillating system 170. The leg of the human body can be described as a pendulum-like structure with inertia, damping, and a spring stiffness. To enhance the motion of user 10 during gait, phase oscillating system 170 adds a parametric excitation force, torque τ, to produce positive power for primary body 180. The direction of torque τ is switched at a time and frequency that is tuned in phase with the frequency of the gait step.

Torque τ is applied by actuator 184 to primary body 180 according to the phase angle φ of primary body 180. The phase angle φ of primary body 180 is calculated based on the physical state of primary body 180 as measured by sensor 182. Sensor 182 is coupled to primary body 180 to measure a physical state of primary body 180. Alternatively, sensor 182 is coupled to another portion of user 10 different than primary body 180. A physical state of primary body 180 can be described by angular position θ, angular velocity $\dot{\theta}$, angular acceleration $\ddot{\theta}$, or a combination thereof. Sensor 182 may detect the angular velocity $\dot{\theta}$ of primary body 180 at lower limb 14 of user 10. Alternatively, sensor 182 may further detect the angular acceleration $\ddot{\theta}$ of primary body 180 at lower limb 14 of user 10. In one embodiment, sensor 182 is an accelerometer coupled to primary body 180 to measure angular acceleration $\ddot{\theta}$ of primary body 180. The angular velocity $\dot{\theta}$ is determined by taking the integral of angular acceleration $\ddot{\theta}$ of primary body 180, and angular position θ is determined by taking the integral of angular velocity $\dot{\theta}$. Angular position θ of primary body 180 may be defined as the angle that primary body 180 makes relative to a plane 198. In one embodiment, plane 198 is horizontal to the ground.

A phase angle φ of primary body 180 is used to determine the torque τ, which is applied by actuator 184 to primary body 180. A phase angle φ of primary body 180 is determined by taking the arc tangent of angular velocity $\dot{\theta}$ versus angular position θ or angular acceleration $\ddot{\theta}$ versus angular velocity $\dot{\theta}$ of primary body 180. In one embodiment, phase angle φ is a kinematic phase angle.

A function of phase angle φ is used to determine the torque τ to apply to primary body 180. In one embodiment, the sine of phase angle φ is the function used to determine the torque τ to be applied to primary body 180. The sine of phase angle φ or other function of phase angle φ can be used to create a signal that varies between −1 and 1. The signal can be used to trigger actuator 184. A phase lock in amplifier or a phase locked loop is used to synchronize a sine generator from a signal from sensor 182. A phase shift, delay, advance, change in amplitude, or change in sine is used to determine the desired torque τ. By using the sine of phase angle φ to determine torque τ, the energy of phase oscillating system 170 remains bounded and stable. In another embodiment, the tangent of phase angle φ is the function used to determine the external force $U_1$. By using the tangent of phase angle ϕ to determine external force $U_1$, the energy of phase oscillating system 170 remains bounded and stable. In yet another embodiment, the cosine of phase angle ϕ is the function used to determine the external force $U_1$. Cosine of phase angle ϕ provides a damping system and reduces the energy of phase oscillating system 170. Other functions, including arctangent, arcsine, arccosine, or another function of phase angle ϕ can be used to determine torque τ. Additionally, the functions can be scaled using a constant in order to scale the magnitude of torque τ.

By applying the positive and negative torque τ at hip joint 190 at specific timing, the net effect enhances or increases movement of primary body 180. Alternatively, torque τ in an opposing direction to decrease, resist, or limit motion of primary body 180. In one embodiment, actuator 184 applies torque τ in simple harmonic oscillation.

Phase oscillating system 170 enhances human motion and reduces the metabolic cost of motion. Phase oscillating system 170 assists different speeds of motion, because a continuous control signal is generated and used as a triggering mechanism. For example, phase oscillating system 170 smoothly transitions from walking to running and back to walking. Phase oscillating system 170 provides a bounded energy and works for linear and rotary systems. Alternatively, phase oscillating system 170 provides a damping of energy to hinder motion, which is useful in exercise or training applications and during downhill walking and running.

Figure 5A:
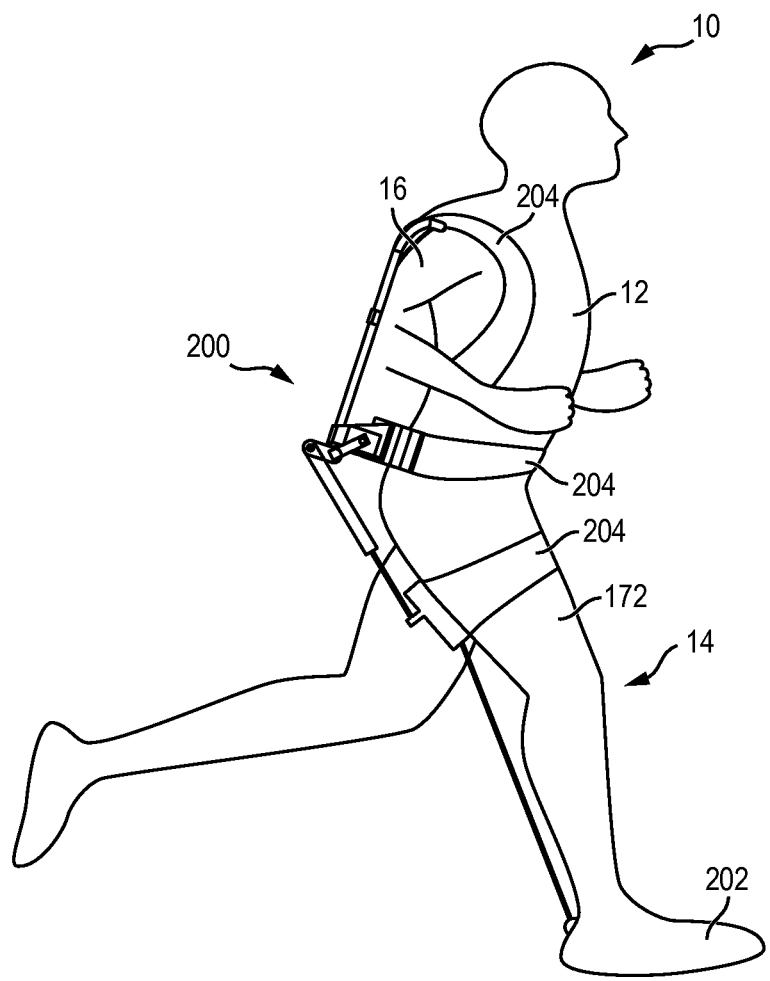
FIGS. 5a-5d illustrate a biarticular phase oscillating system worn on the legs of a user.

FIGS. 5a-5d show a biarticular phase oscillating system. FIG. 5a shows phase oscillating system 200 worn on a lower limb 14 of user 10. Phase oscillating system 200 applies a direct force to a limb of user 10. User 10 wears phase oscillating system 200 coupled to thigh 172 and foot 202. Phase oscillating system 200 is biarticular, meaning the phase oscillating system 200 extends across two joints. In one embodiment, phase oscillating system 200 extends between thigh 172 and foot 202 across the knee joint and the ankle joint.

Phase oscillating system 200 is coupled to the user by an attachment system 204. In one embodiment, attachment system 204 includes straps, which are secured to torso 12, thigh 172, and foot 202 of user 10. In another embodiment, attachment system 204 includes straps, which secure phase oscillating system 200 to another portion of user 10, such as upper limb 16. In yet another embodiment, phase oscillating system 200 is coupled to an exoskeleton or frame, which is coupled to user 10 or worn by user 10.

Figure 5B:
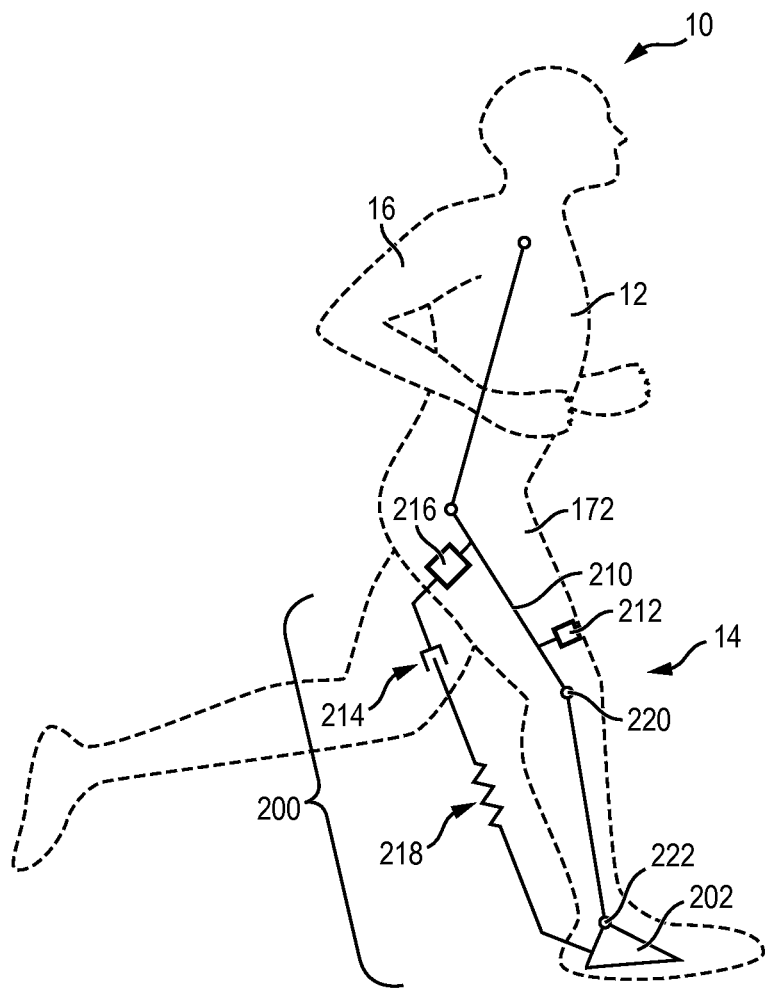

FIG. 5b shows a schematic representation of phase oscillating system 200 extending between thigh 172 and foot 202 across the knee joint and the ankle joint. Phase oscillating system 200 is attached to primary body 210, which is lower limb 14. Phase oscillating system 200 includes a sensor 212, an actuator 214, a controller 216, and a compliant element 218. Actuator 214 produces a linear force that pulls on foot 202. The external forces produced by phase oscillating system 200 act on user 10 at foot 202 across the knee joint 220 and the ankle joint 222.

Sensor 212 is coupled to user 10 at any point on primary body 210 or lower limb 14. Sensor 212 is an accelerometer, vibrometer, rate gyro, potentiometer, inclinometer, or other sensor. Sensor 212 measures a physical state of a primary body 210. The physical state measurement may be linear position, linear velocity, linear acceleration, angular position, rotational or angular velocity, rotational or angular acceleration, or other state measurement. Controller 216 is coupled to sensor 212 and actuator 214. Controller 216 receives and processes the physical state measurement from sensor 212. Based on the physical state measurement from sensor 212, controller 216 triggers actuator 214. Actuator 214 includes any suitable system that applies a force to foot 202 to assist movement of primary body 210. For example, actuator 214 is a linear actuator, pneumatic cylinder, hydraulic actuator, electromagnetic actuator, or another type of motor.

Figure 5C:
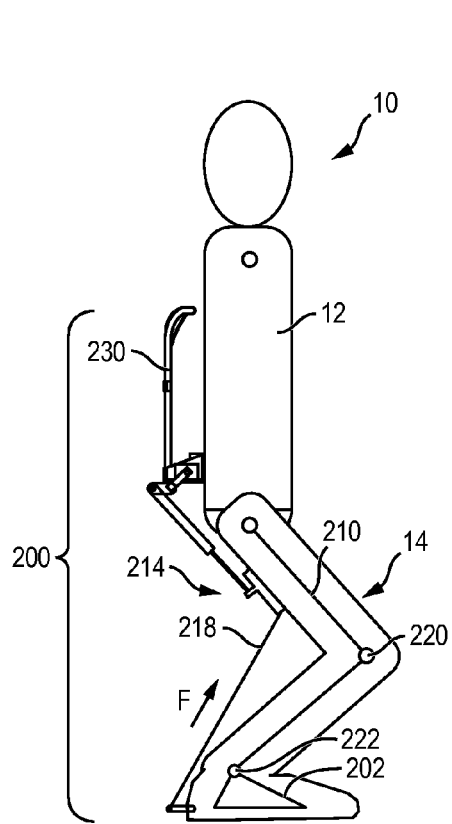

FIG. 5c shows phase oscillating system 200 worn by user 10. Phase oscillating system 200 is incorporated into exoskeleton 230, which is coupled to user 10 or worn by user 10. A force F is applied by actuator 214 to pull on foot 202 during a push off phase of gait. Actuator 214 applies force F in phase with primary body 210 in order to add energy to the gait step of user 10. Force F is applied to foot 202 based on a phase angle ϕ of primary body 210. The phase angle ϕ of primary body 210 is calculated based on the physical state of primary body 210 as measured by sensor 212. In one embodiment, a sine of phase angle ϕ is used to determine force F. A phase lock in amplifier or a phase locked loop is used to synchronize a sine generator from a signal from sensor 212. A phase shift, delay, advance, change in amplitude, or change in sine is used to determine the desired force F. By using the sine of phase angle ϕ to determine force F, the energy of phase oscillating system 200 remains bounded and stable.

Figure 5D:
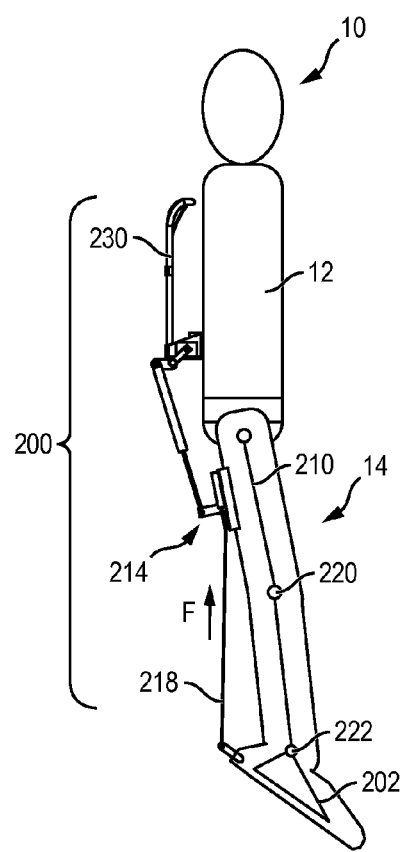

FIG. 5d shows phase oscillating system 200 worn by user 10 during the push off phase of gait. A positive force F is applied to the heel of foot 202 to assist user 10 in plantar flexing at ankle joint 222 to lift the heel and push off the ground. By applying the positive force F at foot 202 at specific timing, the net effect enhances or increases movement of primary body 210. A plurality of phase oscillating systems 200 can be attached to exoskeleton 230 or user 10. For example, one phase oscillating system 200 is attached to each lower limb 14, and each phase oscillating system 200 is tuned in phase with one lower limb 14.

Phase oscillating system 200 enhances human motion and reduces the metabolic cost of motion. Phase oscillating system 200 assists different speeds of motion, because a continuous control signal is generated and used as a triggering mechanism. For example, phase oscillating system 200 smoothly transitions from walking to running and back to walking. Phase oscillating system 200 provides a bounded energy and works for linear and rotary systems.

Figure 6A:
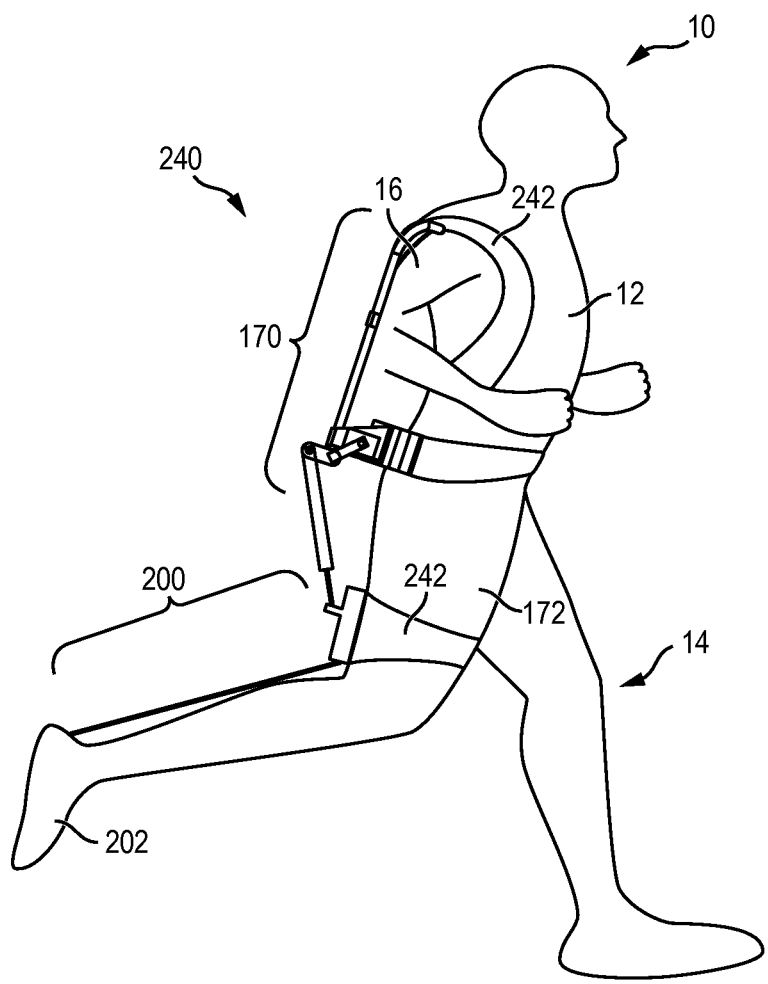
FIGS. 6a-6c illustrate a combination phase oscillating system.
Figure 6B:
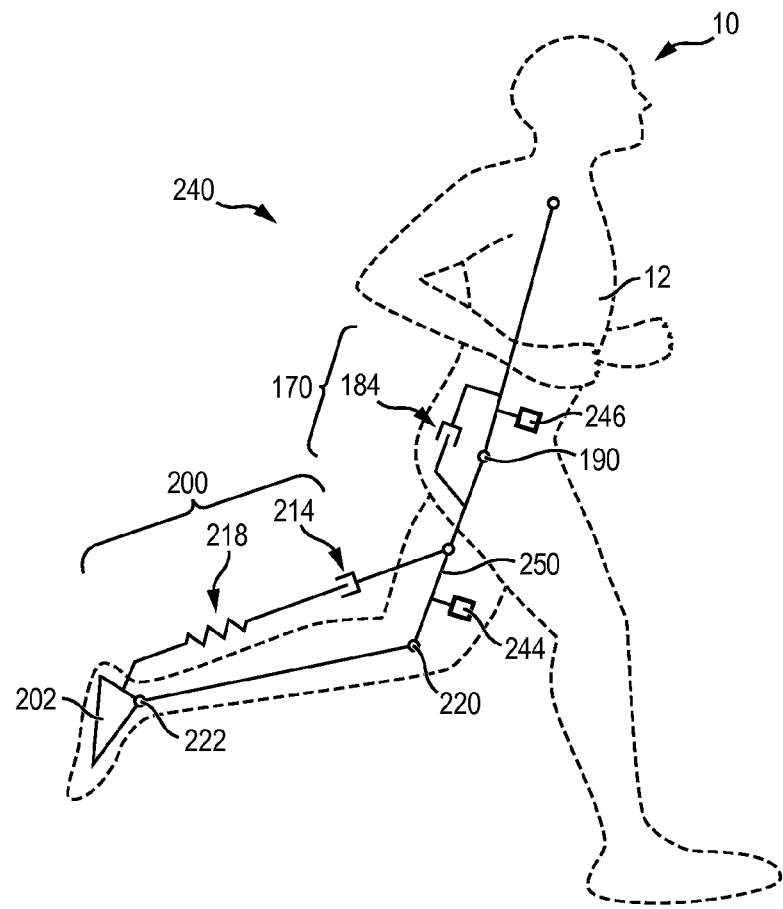
Figure 6C:
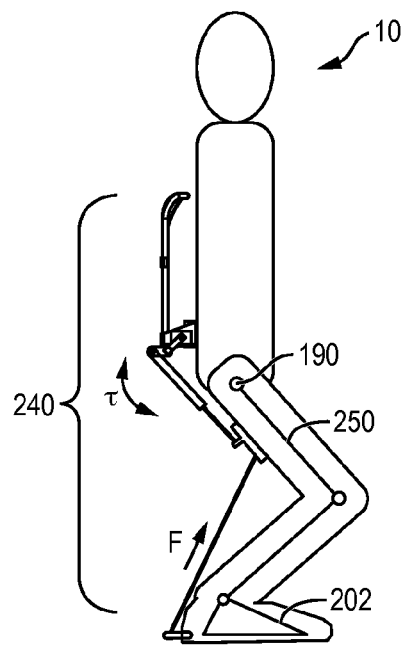

FIGS. 6a-6c show a combination phase oscillating system. FIG. 6a shows phase oscillating system 170 worn by user 10 on the hip and phase oscillating system 200 extending between thigh 172 and foot 202 of user 10. Phase oscillating system 240 incorporates phase oscillating systems 170 and 200 into one device. Phase oscillating system 240 is coupled to the user by an attachment system 242. In one embodiment, attachment system 242 includes straps, which are secured to torso 12, thigh 172, and foot 202 of user 10. In another embodiment, attachment system 242 includes straps, which secure phase oscillating system 240 to another portion of user 10, such as upper limb 16. In yet another embodiment, phase oscillating system 200 is coupled to an exoskeleton or frame, which is coupled to user 10 or worn by user 10.

FIG. 6b shows a schematic representation of phase oscillating system 240. Phase oscillating system 240 includes a sensor 244 and a controller 246. Sensor 244 is an accelerometer, vibrometer, rate gyro, potentiometer, inclinometer, or other sensor. Sensor 244 measures a physical state of a primary body 250. The physical state measurement may be linear position, linear velocity, linear acceleration, angular position, rotational or angular velocity, rotational or angular acceleration, or other state measurement. Controller 246 receives and processes the physical state measurement from sensor 244. Based on the physical state measurement from sensor 244, controller 246 triggers actuators 184 and 214.

Actuators 184 and 214 may be linear actuators, pneumatic cylinders, hydraulic actuators, electromagnetic actuators, or another type of motor.

FIG. 6c shows the forces applied to user 10 by phase oscillating system 240. Torque τ is applied by actuator 184 to primary body 250 at hip joint 190. In one embodiment, actuator 184 applies torque τ in phase with primary body 250 in order to add energy to the gait step of user 10. Actuator 214 produces a linear force that pulls on foot 202. The force F is applied by actuator 214 to pull on foot 202 during a push off phase of gait. Actuator 214 applies force F in phase with primary body 250 in order to add energy to the gait step of user 10. Force F and torque τ are applied to user 10 based on a phase angle φ of primary body 250. The phase angle φ of primary body 250 is calculated based on the physical state of primary body 250 as measured by sensor 244. In one embodiment, a sine of phase angle φ is used to determine force F and torque τ. A phase lock in amplifier or a phase locked loop is used to synchronize a sine generator from a signal from sensor 244. A phase shift, delay, advance, change in amplitude, or change in sine is used to determine the desired force F. By using the sine of phase angle φ to determine force F and torque τ, the energy of phase oscillating system 240 remains bounded and stable.

Phase oscillating system 240 enhances human motion and reduces the metabolic cost of motion. Phase oscillating system 240 assists different speeds of motion, because a continuous control signal is generated and used as a triggering mechanism. For example, phase oscillating system 240 smoothly transitions from walking to running and back to walking. Phase oscillating system 240 provides a bounded energy and works for linear and rotary systems. Alternatively, phase oscillating system 240 provides a damping of energy to hinder motion, which is useful in exercise or training applications and during downhill walking and running.

Figure 7A:
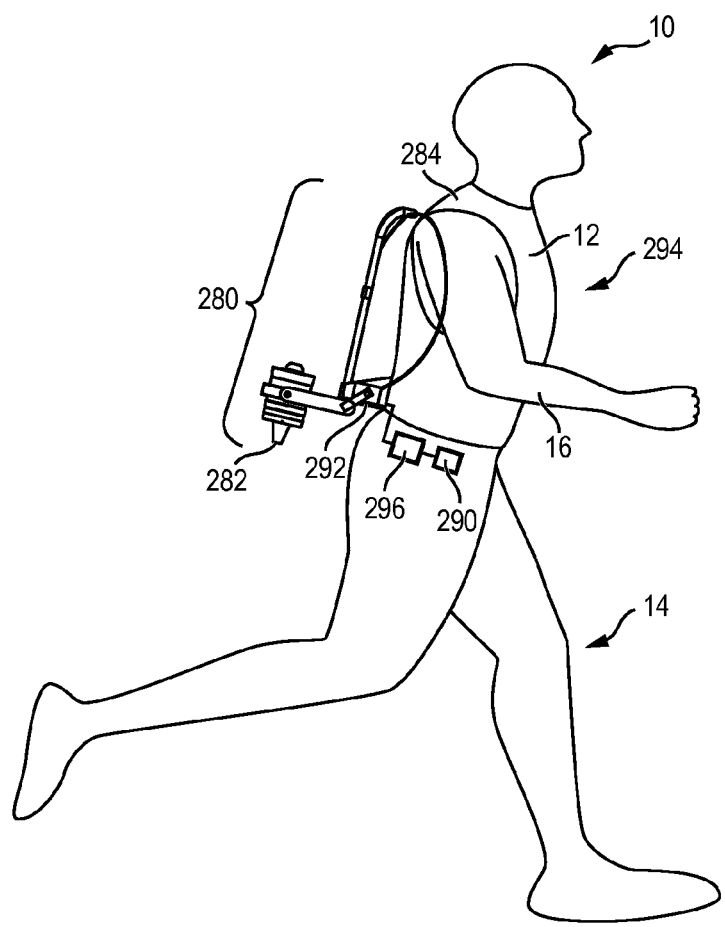
FIGS. 7a-7b illustrate a phase oscillating system including a ducted fan.
Figure 7B:
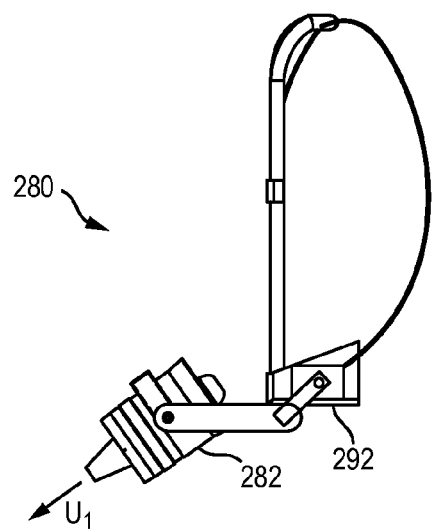

FIGS. 7a-7b show a phase oscillating system including a ducted fan. Phase oscillating system 280 applies an external force to user 10 using one or more ducted fans 282. User 10 wears a phase oscillating system 280 in order to increase or decrease the available power during movement of user 10, for example, during gait or other activities. Phase oscillating system 280 senses motion of the human body and responds by adding a negative or a positive external force. The external forces created by the ducted fan increases the horizontal ground reaction force to add energy to the gait of user 10.

User 10 wears phase oscillating system 280, or phase oscillating system 280 is coupled to the user by an attachment system 284. In one embodiment, attachment system 284 includes straps, which are secured to a torso of user 10. In another embodiment, attachment system 284 includes straps, which secure phase oscillating system 280 to an upper limb 16 or a lower limb 14 of user 10. In yet another embodiment, phase oscillating system 280 is coupled to an exoskeleton or frame, which is coupled to user 10 or worn by user 10.

Phase oscillating system 280 includes a sensor 290, one or more actuators 292, and one or more ducted fans 282. Phase oscillating system 280 is attached to a primary body 294. Primary body 40 may be torso 12, lower limbs 14, and upper limbs 16, or other body portion of user 10. Primary body 294 is a human, animal, robot, or other object. In one embodiment, torso 12 of user 10 represents primary body 294. Sensor 290 is coupled to user 10. Sensor 290 is an accelerometer, vibrometer, rate gyro, potentiometer, inclinometer, or other sensor. Sensor 290 measures a physical state of a primary body 294. The physical state measurement may be linear position, linear velocity, linear acceleration, angular position, rotational or angular velocity, rotational or angular acceleration, or other state measurement.

A controller 296 is coupled to sensor 290 and actuator 292. Controller 296 receives and processes the physical state measurement from sensor 290. Based on the physical state measurement from sensor 290, controller 296 triggers actuator 292 to direct the airflow of ducted fans 282. The airflow of ducted fans 282 produces an external force, which acts on primary body 294. Actuator 292 is engaged or triggered according to the physical state of primary body 294 in order to provide an external force that adds energy to or subtracts energy from the motion of primary body 294.

In one embodiment, sensor 290 is an accelerometer attached to primary body 294 to measure acceleration $\ddot{Y}_1$ of primary body 294. The acceleration $\ddot{Y}_1$ is integrated once to determine velocity $\dot{Y}_1$ of primary body 294 and is integrated second time to determine position $Y_1$ of primary body 294. A phase angle $\phi_1$ of primary body 294 is used to determine the external force $U_1$, which is applied to ducted fans 282 to primary body 294.

In another embodiment, sensor 290 is a rate gyro mounted to each individual leg and used to trigger each ducted fan 282 independently. A rate gyro signal is pseudo integrated to determine the angular position θ of the thigh 172. A phase angle φ is determined based on angular velocity $\dot{\theta}$ and angular position θ. A function of phase angle φ is used to trigger ducted fans 282. In one embodiment, the sine of phase angle φ, as shown in equation (4), is used to trigger an individual ducted fan 282. The sine of phase angle φ can be used to create a signal that varies between −1 and 1. The signal or −1 or 1 is used as a trigger for actuator 292 to oscillate ducted fans 282.

A phase lock in amplifier or a phase locked loop is used to synchronize a sine generator from a signal from sensor 290. A phase shift, delay, advance, change in amplitude, or change in sine is used to determine the desired airflow direction of ducted fans 282. By using the sine of phase angle φ to trigger actuators 292, the energy of phase oscillating system 280 remains bounded and stable. In another embodiment, the tangent of phase angle φ is the function used to trigger actuators 292. By using the tangent of phase angle φ to trigger actuators 292, the energy of phase oscillating system 280 remains bounded and stable. In yet another embodiment, the cosine of phase angle φ is the function used to determine trigger actuators 292. Cosine of phase angle φ provides a damping system and reduces the energy of phase oscillating system 280. Other functions, including arctangent, arcsine, arccosine, or another function of phase angle φ can be used to trigger actuators 292.

Actuator 292 drives ducted fans 282. Ducted fans 282 rotate to provide an oscillating external force. In one embodiment, actuator 292 orients the direction of ducted fans 282 or the direction of airflow for ducted fans 282. Phase oscillating system 280 adjusts the direction of airflow for ducted fans 282 based on the gait of user 10. In one embodiment, ducted fans are powered by brushless DC motors to create an external, horizontal force at torso 12 of user 10 to enhance running speed. The external force provided by ducted fans 282 increases the horizontal ground reaction force to increase the forward force and propulsion power to overcome drag and rolling friction at the ground. Additionally, the external force is turned off or redirected during the stance phase of gait to reduce the braking forces.

FIG. 7b shows phase oscillating system 280 with ducted fans 282 rotated with respect to vertical. Ducted fans 282 can be aimed in any direction to provide external force $U_1$. In one embodiment, external force $U_1$ has vertical $U_y$ and horizontal external force $U_x$ components. An external horizontal force $U_x$ is provided to aid the runner at a magnitude of ten percent of body weight. An external horizontal force $U_x$ is added to create a propulsive power to the user's gait. In one embodiment, phase oscillating system 280 is a jetpack that includes two ducted fans 282 that create a propulsive force of up to 45 Newtons (N) each. In one embodiment, external force $U_1$ is angled at 30 degrees when ducted fans 282 are positioned. A 30 degree angle provides force upwards or downwards in a vertical direction as well as a propulsive force in the horizontal direction. The external force $U_1$ oscillates direction according to the gait of user 10. In another embodiment, the external force $U_1$ is directed horizontally forward and backward to increase propulsive force during push off and enhance braking as the foot strikes the ground. In another embodiment, the external force $U_1$ is redirected up and down to enhance the up and down motion of torso 12 of user 10 during running. In another embodiment, the external force $U_1$ is directed horizontally to aid push-off, and no external force $U_1$ is applied during the swing phase of gait or when the foot strikes the ground. In another embodiment, the external force $U_1$ is directed horizontally during the push-off phase and is directed vertically as the foot strikes the ground to reduce the impact force of the foot strike.

Phase oscillating system 280 enhances human motion and reduces the metabolic cost of motion. Phase oscillating system 280 assists different speeds of motion, because a continuous control signal is generated and used as a triggering mechanism. For example, phase oscillating system 280 smoothly transitions from walking to running and back to walking. Phase oscillating system 280 provides a bounded energy and works for linear and rotary systems. Alternatively, phase oscillating system 280 provides a damping of energy to hinder motion, which is useful in exercise or training applications and during downhill walking and running.

The phase oscillating systems described herein provide the advantage of adding or subtracting energy when walking, jogging, running, carrying loads, climbing stairs, slopes, or hills, or reducing energy when walking down stairs or hills. The phase oscillating systems are also used to increase, maintain, or decrease vibrations in cars, airplanes, or appliances. The phase oscillating systems are also used as mechanical amplifiers to increase the energy harvested by energy harvesting devices. The phase oscillating systems are also used to alter the motion of a load being carried.

Figure 8A:
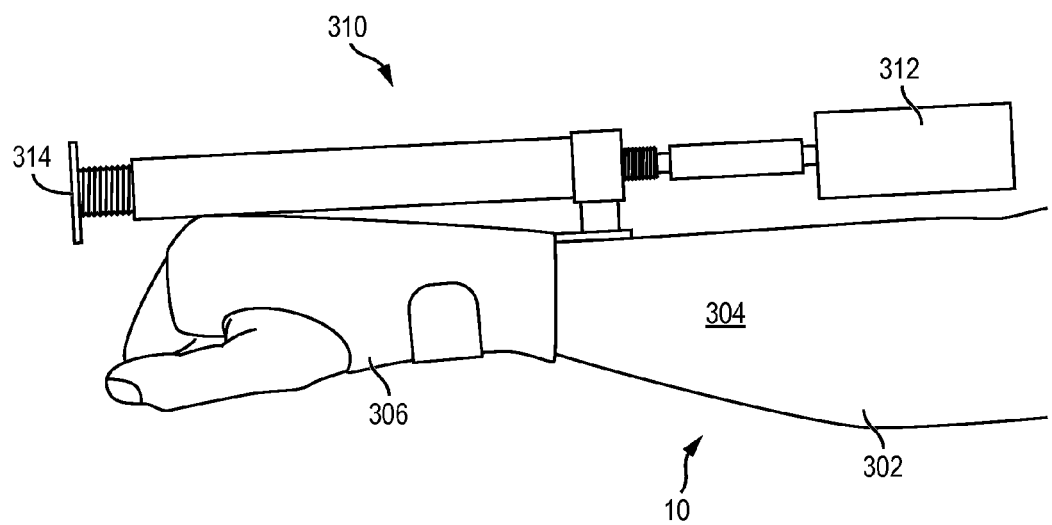
FIGS. 8a-8d illustrate a phase oscillating system worn on an arm of a user.

FIGS. 8a-8d show a phase oscillating system worn on an arm of a user. FIG. 8a shows a phase oscillating system 300 worn on arm 302 of user 10. Phase oscillating system 300 senses motion of arm 302 and responds by adding a negative or a positive external force. Phase oscillating system 300 is a device that oscillates a secondary mass, which applies an external force to a primary body. Arm 302 is the primary body 304 in phase oscillating system 300. User 10 wears phase oscillating system 300, or phase oscillating system 300 is coupled to the user by an attachment system 306. In one embodiment, attachment system 306 secures phase oscillating system 300 to arm 302 of user 10. In another embodiment, attachment system 306 includes straps, which secure phase oscillating system 300 to an upper limb 16 or a lower limb 14 of user 10. In yet another embodiment, phase oscillating system 300 is coupled to an exoskeleton or frame, which is coupled to user 10 or worn by user 10. In another embodiment, attachment system 306 is a protective wrist support. Attachment system 306 is a wearable, comfortable, exoskeleton apparatus that does not impede the normal functions of the hand and arm and can be put on and taken off quickly.

Phase oscillating system 300 is incorporated into a battering ram device 310. A secondary body 312 is attached to primary body 304 to enhance the motion of primary body 304. Secondary body 312 moves forward to increase the impact force, or to slow the effective swing down such that the human muscles can more efficiently add energy to battering ram device 310. Secondary body 312 moves backward at impact to increase follow-through force. Secondary body 312 is oscillated back and forth to assist in movement and increase hitting frequency. The proper timing of oscillation is based on a phase angle method or a phase locked loop method. Secondary body 312 is moved to change the center of gravity of battering ram device 310 to make the device easier to swing. Battering ram device 310 is attached to arm 302 to create a punching device. In another embodiment, battering ram device 310 is attached to a leg to create a kicking device.

Battering ram device 310 increases the maximum punching force and speed of the human hand. When striking a target, the device accelerates secondary body 312 effectively adding kinetic energy to the first or arm 302. The device can be controlled in one of two modes for either high power punches or increased punching frequency. With battering ram device 310, a soldier can now have the ability to punch very rapidly in hand-to-hand combat or punch through walls, doors, or other debris.

As arm 302 is moved in a manner consistent with punching, the device activates, accelerating secondary body 312 to produce a greater force at impact plate 314 than can be produced by user 10 without battering ram device 310. Secondary body 312 can be accelerated in both directions depending upon the device mode, either utilizing the forces required to accelerate secondary body 312 or the forces created as secondary body 312 collides with end stops within battering ram device 310.

As user 10 begins to punch, controller 324 monitors the movement of primary body 304 using an accelerometer to determine the type of punch intended by user 10, high force single punch or an enhanced force at a high frequency for repetitive punches. In the high force mode, secondary body 312 accelerates and collides with enclosure 330. The momentum secondary body 312 is transferred through impact plate 314 to the target object. Immediately after impact, secondary body 312 is accelerated backward causing a forward force against the target increasing the duration of the hit creating an amplified follow-through punch. In the high frequency mode, the motion of secondary body 312 is anti-phase with the motion of the arm 302. As the arm moves forward, secondary body 312 moves backward increasing the forward velocity thus enhancing impact force. As the arm moves backward, secondary body 312 moves forward increasing the arm's backward velocity such that high frequency, repetitive punching is possible.

Figure 8B:
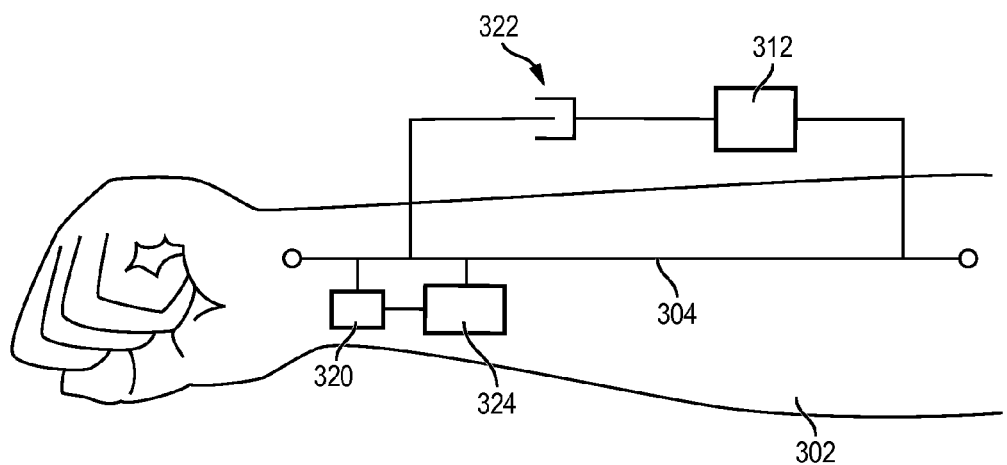

FIG. 8b shows a schematic representation of phase oscillating system 300. Phase oscillating system 300 includes sensor 320, actuator 322, and controller 324. Sensor 320 is an accelerometer, vibrometer, rate gyro, potentiometer, inclinometer, global positioning system, or other sensor. Sensor 320 measures a physical state of a primary body 304. The physical state measurement may be linear position, linear velocity, linear acceleration, angular position, rotational or angular velocity, rotational or angular acceleration, or other state measurement. Controller 324 is coupled to sensor 320 and actuator 322. Controller 324 receives and processes the physical state measurement from sensor 320. Based on the physical state measurement from sensor 320, controller 324 triggers actuator 322 to move secondary body 312. Actuator 322 drives the oscillations of secondary body 312. Actuator 322 may include a linear actuator, pneumatic actuator, hydraulic actuator, electromagnetic actuator, or other suitable motor. Actuator 322 quickly accelerates secondary body 312 by either stored high pressure gas or a combustion chamber, a lightweight frame utilizing composites and or alloys, valves or firing pin mechanism controlled by a microprocessor, and an impact plate to transfer kinetic energy to a target.

The movement of secondary body 312 produces an external force, which acts on primary body 304. Secondary body 312 may comprise any type of object, including a weight or combination of fluids of different densities. In one embodiment, secondary body 312 is an eccentric mass. Secondary body 312 is coupled to primary body 304 at any position along primary body 304.

Figure 8C:
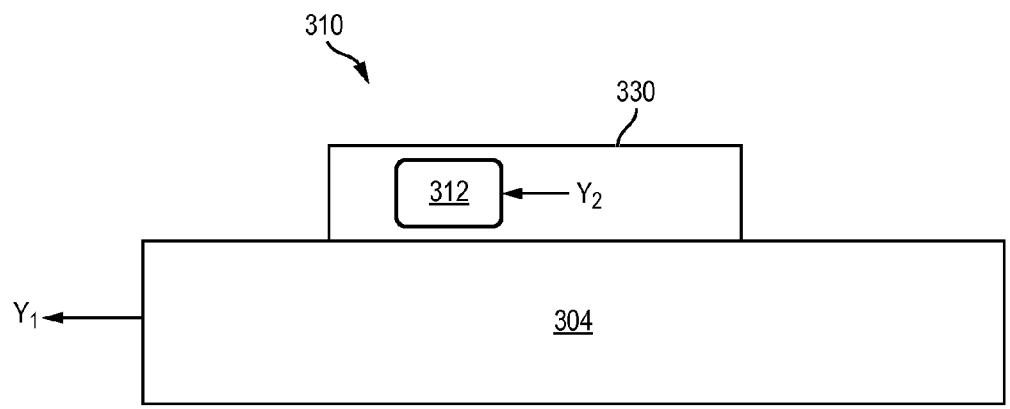

FIG. 8c shows a schematic representation of phase oscillating system 300. In one embodiment, sensor 320 is an accelerometer attached to primary body 304 to measure acceleration $\ddot{Y}_1$ of primary body 304. The acceleration $\ddot{Y}_1$ is integrated once to determine velocity $\dot{Y}_1$, and a second time to determine position Y of primary body 304. A phase angle $\phi$ may be determined by taking the arc tangent of velocity $\dot{Y}_1$ versus position Y or acceleration $\ddot{Y}_1$ versus velocity $\dot{Y}_1$. A function of the phase angle $\phi$ determines the desired external force to be applied to primary body 304. For example, the desired external force can be determined by using the functions shown in equations (4), (5), (6), (7), or (8). In one embodiment, phase angle $\phi$ is a kinematic phase angle. A phase lock in amplifier or a phase locked loop may be used to synchronize a sine generator or pattern from a signal from sensor 320. A phase shift, delay, advance, change in amplitude, or change in sine may be used in determining the desired external force.

The oscillation or movement of secondary body 312 produces external force $U_1$ by pulling on or pushing against primary body 304. Secondary body 312 is oscillated based on the phase angle $\phi_1$ of primary body 304. By oscillating secondary body 312 in phase with respect to primary body 304, energy is added to the motion of primary body 304. By oscillating secondary body 312 out of phase with respect to primary body 304, energy is subtracted from the motion of primary body 304.

The desired external force $U_1$ may be divided by the mass of secondary body 312 to determine a desired acceleration $\ddot{Y}_2$ for secondary body 312. The desired acceleration $\ddot{Y}_2$ is integrated once to determine a velocity profile $\dot{Y}_2$. The desired acceleration $\ddot{Y}_2$ is integrated twice to determine a desired position $Y_2$ for secondary body 312. Secondary body 312 is oscillated based on the desired position profile $Y_2$ or velocity profile $\dot{Y}_2$. The movement of secondary body 312 provides a reaction force by pulling or pushing against primary body 304 or by hitting the end of enclosure 330.

Secondary body 312 is oscillated by a number of different methods, for example, a linear actuator, a pneumatic actuator, a hydraulic actuator, or other motor. By oscillating secondary body 312 based on phase angle $\phi$ of primary body, energy is applied to the motion of primary body 304. Such energy may be used to decrease the energy necessary to be exerted by primary body 304 to move with a certain speed or acceleration.

As secondary body 312 oscillates, the force applied on primary body 304 by secondary body 312 alternates between a positive and negative force with respect to the direction of movement of primary body 304. While secondary body 312 applies a positive force on primary body 304 and primary body 304 has a positive velocity, the positive force enhances the movement of primary body 304 by applying positive power. While secondary body 312 applies a negative force on primary body 304 and primary body 304 has a negative velocity, the negative force enhances the movement of primary body 304 by applying positive power. While secondary body 312 applies a positive force on primary body 304 and primary body 304 has a negative velocity, the positive force resists the movement of primary body 304 by applying negative power. While secondary body 312 applies a negative force on primary body 312 and primary body 312 has a positive velocity, the negative force resists the movement of primary body 304 by applying negative power. By applying positive power at the correct times based on phase angle $\phi$, the net effect can be to assist movement. By applying negative power at the correct times based on the negative of phase angle $\phi$, the net effect can be to resist movement.

Phase oscillating system 300 provide advantages by making it easier for user 10 to swing battering ram device 310. The hitting frequency, the force at impact, and the follow-through force can be increased. The motion of the center of mass can be enhanced to ease the use and increase the human muscle efficiency.

Figure 8D:
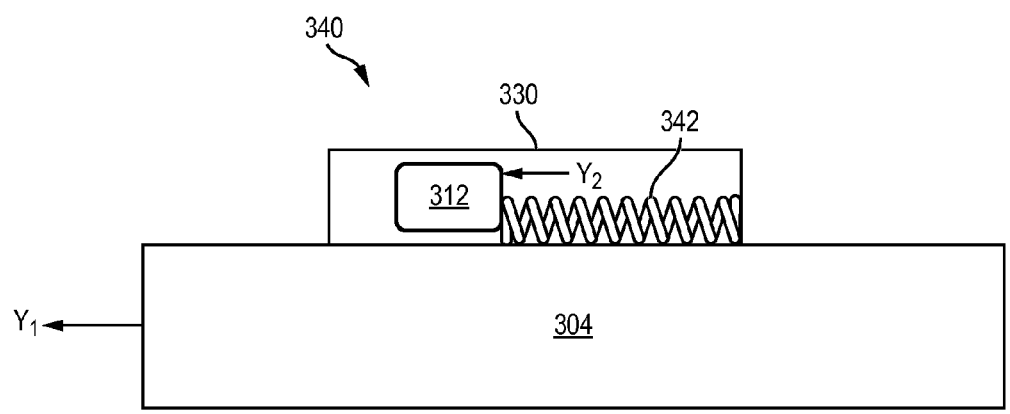

FIG. 8d shows an alternative phase oscillating system 340. Phase oscillating system 340 includes an optional suspension system 342 coupled to secondary body 312. Suspension system 342 may include a plurality of spring forces and damper forces. Suspension system 342 may include springs, air springs, air pistons, dampers, and bumpers. In one embodiment, suspension system 342 includes a compliant element such as a helical or coil spring.

Secondary body 312 is coupled to primary body 304 by a spring 342 or similar mechanism that allows secondary body 312 to oscillate with respect to primary body 304. In one embodiment, the vector of motion or actuation of secondary body 312 is not parallel to the vector of motion of primary body 304.

The desired external force $U_1$ is applied on primary body 304 by secondary body 312. Secondary body 312 may oscillate such that secondary body 312 alternately applies positive and negative forces on primary body 304. By applying the positive and negative forces at specific timing, the net effect enhances or inhibits movement of primary body 304. In one embodiment, secondary body 312 moves in simple harmonic oscillation. Secondary body 312 may move linearly, circularly, elliptically, or in any other pattern.

In one embodiment, the movement of secondary body 312 provides a reaction force by pulling or pushing against primary body 304 or by hitting the end of enclosure 330. When secondary body 312 impacts enclosure 330 mounted on primary body 304, the impact force is increased. In another embodiment, secondary mass 312 moves in an opposite direction to primary body 304 to increase the follow-through force.

Secondary body 312 moves in an opposing direction or out of phase with respect to primary body 304, thereby increasing or assisting oscillatory motion of primary body 304 relative to the ground and increase hitting frequency. Alternatively, secondary body 312 moves the same direction as primary body 304 in phase with primary body 304, thereby inhibiting oscillatory motion of primary body 304 relative to the ground to aid in dampening the recoil force.

Figure 9A:
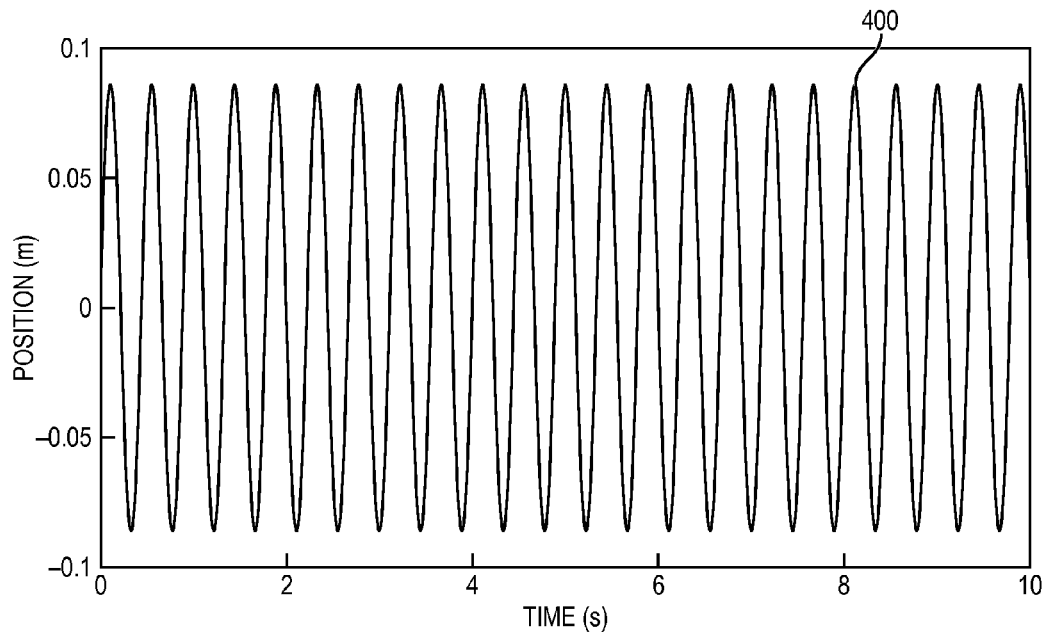
FIGS. 9a-9d illustrate graphical representations of the operation of a phase oscillating system.

FIGS. 9a-9d show graphical representations of the operation of a phase oscillating system. FIG. 9a shows phase oscillating systems as the system oscillates back and forth according to the sine of phase angle $\phi$. The sine of phase angle $\phi$ for phase oscillating systems is shown graphically as line 400. In one embodiment, mass m of a primary body is 1 kilogram (kg), spring constant k is 200 Newtons per meter (N/m), damping b is 0.6 Newton-seconds per meter (Ns/m), constant c is 0.6, initial velocity is 1.2 meters per second (m/s), and an initial position is at the ground, or 0 meters (m). In FIG. 9a, line 400 represents a phase oscillating system that provides positive power to a primary body. By using the sine of phase angle $\phi_1$ to determine external force $U_1$, the energy of the phase oscillating system remains bounded and stable.

Figure 9B:
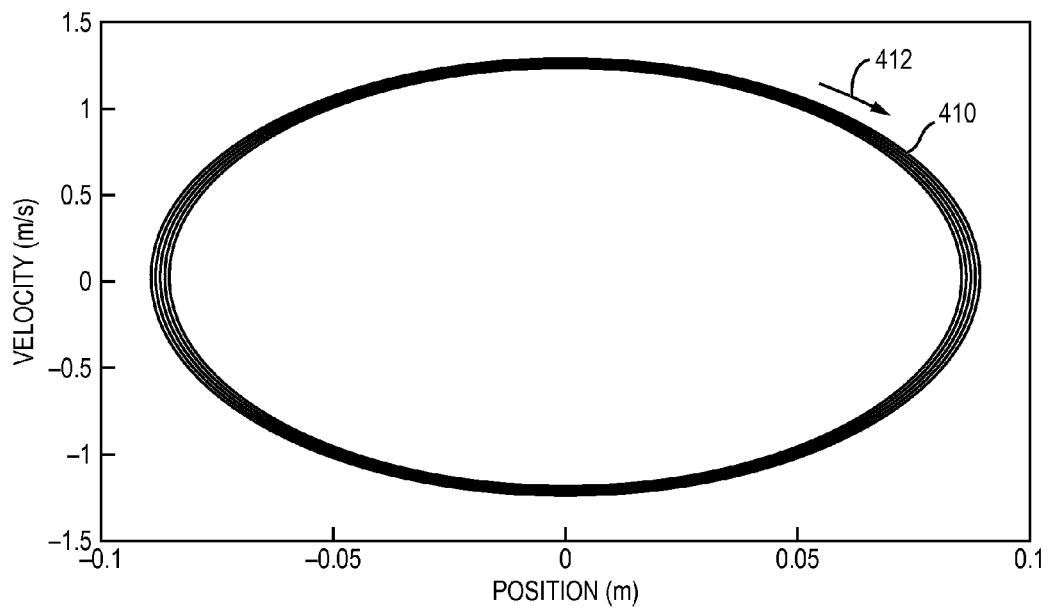

FIG. 9b shows a phase plot that demonstrates a limit cycle as the system position oscillates back and forth. In FIG. 9b, line 410 represents a phase oscillating system that provides positive power to a primary body. By using the sine of phase angle $\phi_1$ to determine external force $U_1$, the energy of the phase oscillating system remains bounded and stable. The direction of the cycle in the phase plot of FIG. 9b is shown by arrow 412. In one embodiment, mass m of a primary body is 1 kg, spring constant k is 200 N/m, damping b is 0.6 Ns/m, and constant c is 0.6, initial velocity is 1.2 m/s, and an initial position is at the ground, or 0 m.

Figure 9C:
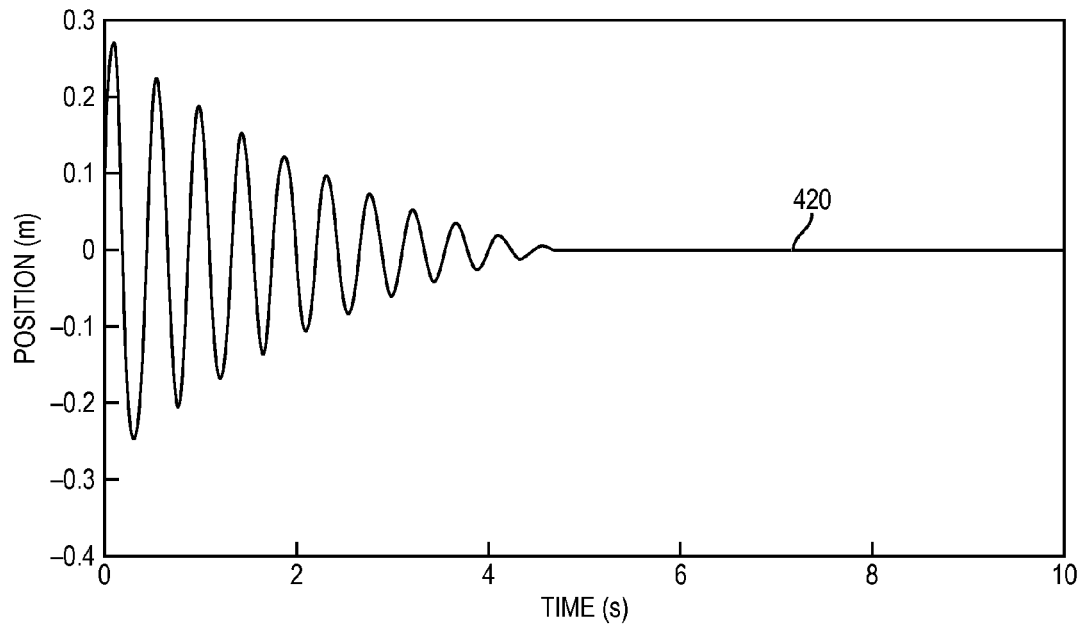

FIG. 9c shows the phase oscillating system as the system damps to zero. In FIG. 9c, line 420 represents a phase oscillating system that provides negative power or damping to a primary body. In one embodiment, mass m of a primary body is 1 kg, spring constant k is 200 N/m, damping b is 0.6 Ns/m, and constant c is −0.6, initial velocity is 4 m/s, and an initial position is at the ground, or 0 m.

Figure 9D:
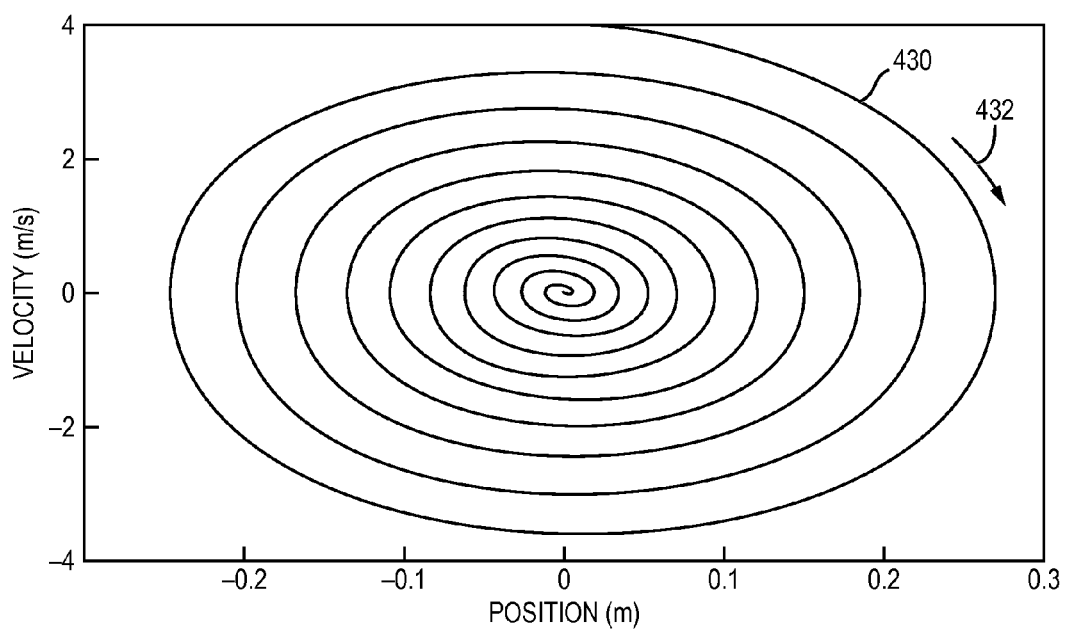

FIG. 9d shows a phase plot as the system position and velocity return back to zero. In FIG. 9d, line 430 represents a phase oscillating system that provides negative power or damping to a primary body. The direction of the cycle in the phase plot of FIG. 9d is shown by arrow 432. In one embodiment, mass m of a primary body is 1 kg, spring constant k is 200 N/m, damping b is 0.6 Ns/m, and constant c is −0.6, initial velocity is 4 m/s, and an initial position is at the ground, or 0 m.

While one or more embodiments of the present invention have been illustrated in detail, the skilled artisan will appreciate that modifications and adaptations to those embodiments may be made without departing from the scope of the present invention as set forth in the following claims.

What is claimed:

1. A method of making a movement assistance device, comprising:
   providing a sensor;
   measuring a physical state of a limb using the sensor;
   determining a phase angle of the limb based on the physical state;
   filtering the phase angle of the limb using a sine function;
   coupling an actuator to the limb; and
   triggering the actuator based on the phase angle of the limb to provide an oscillating force to assist movement of the limb.

2. The method of claim 1, further including:
   providing a mass coupled to the limb and actuator; and
   oscillating the mass using the actuator.

3. The method of claim 1, wherein measuring the physical state of the limb further includes measuring position, velocity, or acceleration of the limb.

4. The method of claim 1, further including synchronizing the actuator with the physical state using a phase lock in amplifier or a phase locked loop.

5. The method of claim 1, further including:
   coupling a damper to the limb; and
   harvesting energy from the damper, wherein the energy is produced by movement of the limb.

6. A method of making a phase oscillating device, comprising:
   providing a sensor;
   measuring a physical state of a primary body of a user using the sensor;
   determining a phase angle of the primary body of the user based on the physical state;
   filtering the phase angle of the primary body of the user; and
   triggering an actuator based on the phase angle of the primary body of the user to oscillate a force or a torque applied to the primary body of the user.

7. The method of claim 6, further including:
   coupling a secondary body to the primary body of the user; and
   oscillating the secondary body using the actuator, the force or torque applied to the primary body of the user by the oscillating secondary body.

8. The method of claim 6, further including triggering the actuator in phase with a gait step of the primary body of the user.

9. The method of claim 6, further including enhancing or restricting movement of the primary body of the user with the force or torque.

10. The method of claim 6, wherein measuring the physical state of the primary body of the user further includes measuring position, velocity, or acceleration of the primary body of the user.

11. The method of claim 6, further including coupling a fan to the actuator, wherein the fan produces the force applied to the primary body of the user.

12. The method of claim 6, wherein the primary body of the user includes a limb of the user.

13. The method of claim 6, wherein the primary body of the user includes a torso of the user.

14. The method of claim 6, further including measuring the physical state continuously to provide a continuous control signal for triggering the actuator.

15. The method of claim 6, further including determining the phase angle based on a function of acceleration and velocity of the primary body.

16. The method of claim 6, further including determining the phase angle based on a function of velocity and position of the primary body.

17. A phase oscillating device, comprising:
   a primary body of a user;
   a sensor coupled to the primary body of the user;
   a controller coupled to the sensor to determine a phase angle of the primary body of the user; and
   an actuator coupled to the controller to oscillate a signal to the actuator based on a trigonometric function of the phase angle of the primary body of the user.

18. The phase oscillating device of claim 17, further including a secondary body coupled to the actuator and primary body of the user.

19. The phase oscillating device of claim 18, wherein the actuator oscillates the secondary body to assist or restrict movement of the primary body of the user.

20. The phase oscillating device of claim 17, further including a fan coupled to the primary body of the user and actuator to apply an oscillating force to primary body of the user based on the signal to the actuator.

21. The phase oscillating device of claim 17, further including an exoskeleton structure coupled to the primary body of the user, controller, and actuator, the exoskeleton configured to fit onto the user.

22. A method of making a phase oscillating device, comprising:
   providing a sensor;
   measuring a physical state of a primary body of a user using the sensor;
   determining a phase angle of the primary body of the user based on the physical state;
   coupling an actuator to the primary body of the user; and triggering the actuator based on a trigonometric function of the phase angle of the primary body of the user to provide a force or a torque to assist movement of the primary body of the user.

23. The method of claim 22, wherein measuring the physical state of the primary body of the user further includes measuring position, velocity, or acceleration of the primary body of the user.

24. The method of claim 22, further including synchronizing the actuator with the physical state using a phase lock in amplifier or a phase locked loop.

25. The method of claim 22, wherein the primary body of the user includes a torso of the user.

26. The method of claim 22, further including determining the force to assist movement of the primary body by filtering the phase angle using a sine function.

27. A method of making a phase oscillating device, comprising:
providing a sensor;
measuring a physical state of a primary body of a user using the sensor;
determining a phase angle of the primary body of the user based on the physical state;
filtering the phase angle using a trigonometric function;
producing a signal based on the filtered phase angle; and
controlling an actuator based on the signal.

28. The method of claim 27, wherein the primary body of the user includes a limb of the user.

29. The method of claim 27, further including determining the phase angle based on a function of acceleration and velocity of the primary body.

30. The method of claim 27, further including determining the phase angle based on a function of velocity and position of the primary body.

31. The method of claim 27, further including synchronizing the actuator with the physical state using a phase lock in amplifier or a phase locked loop.

* * * * *